US011711345B2

(12) United States Patent
Joshi et al.

(10) Patent No.: US 11,711,345 B2
(45) Date of Patent: Jul. 25, 2023

(54) SPLIT TUNNEL-BASED SECURITY

(71) Applicant: McAfee, LLC, San Jose, CA (US)

(72) Inventors: Harsha Ramamurthy Joshi, Bangalore (IN); Shashank Jain, Bangalore (IN); Himanshu Srivastava, Bangalore (IN); Dattatraya Kulkarni, Bangalore (IN); Srikanth Nalluri, Karnataka (IN)

(73) Assignee: McAfee, LLC, San Jose, CA (US)

( * ) Notice: Subject to any disclaimer, the term of this patent is extended or adjusted under 35 U.S.C. 154(b) by 44 days.

(21) Appl. No.: 16/913,048

(22) Filed: Jun. 26, 2020

(65) Prior Publication Data
US 2021/0344651 A1    Nov. 4, 2021

(30) Foreign Application Priority Data
May 2, 2020   (IN) .............................. 202041018806

(51) Int. Cl.
*H04L 9/40* (2022.01)
*H04L 12/46* (2006.01)
*H04L 61/4511* (2022.01)
*H04L 61/5007* (2022.01)

(52) U.S. Cl.
CPC ...... *H04L 63/0272* (2013.01); *H04L 12/4633* (2013.01); *H04L 12/4641* (2013.01); *H04L 61/4511* (2022.05); *H04L 61/5007* (2022.05)

(58) Field of Classification Search
CPC ............. H04L 12/4633; H04L 12/4641; H04L 61/1511; H04L 61/2007; H04L 63/0272
USPC ......................................................... 709/240
See application file for complete search history.

(56) References Cited

U.S. PATENT DOCUMENTS

| | | | | |
|---|---|---|---|---|
| 7,756,987 | B2 * | 7/2010 | Wang ................ | H04L 29/12594 709/229 |
| 8,284,774 | B2 * | 10/2012 | Roberts ................. | H04H 60/95 370/392 |
| 9,015,090 | B2 * | 4/2015 | Chien ................ | H04L 63/1408 706/22 |
| 9,455,909 | B2 * | 9/2016 | Parla .................... | H04L 61/1511 |
| 10,721,338 | B2 * | 7/2020 | Ravi ....................... | H04L 45/54 |
| 10,740,363 | B2 * | 8/2020 | Mahjoub ................. | H04L 43/04 |
| 10,897,475 | B2 * | 1/2021 | Clarke ................ | H04L 63/1433 |
| 10,958,662 | B1 * | 3/2021 | Sole ....................... | H04L 63/105 |
| 11,057,404 | B2 * | 7/2021 | Chen ................... | H04L 63/1466 |
| 11,405,237 | B2 * | 8/2022 | Rudnik .............. | H04L 63/0281 |
| 2003/0219022 | A1 * | 11/2003 | Dillon ................ | H04L 12/2856 370/395.52 |
| 2006/0056297 | A1 * | 3/2006 | Bryson ............... | H04L 63/0272 370/230 |

(Continued)

*Primary Examiner* — David P Zarka
(74) *Attorney, Agent, or Firm* — Patent Capital Group

(57) ABSTRACT

There is disclosed in one example a computing apparatus, including: a hardware platform including a processor and a memory; a network interface; an operating system including a native internet protocol (IP) stack; and a security agent, including instructions encoded within the memory to instruct the processor to: establish a split virtual private network (VPN) tunnel with a remote VPN service; receive outgoing network traffic; direct a first portion of the outgoing traffic to the VPN tunnel, including determining that the first portion includes an outgoing domain name service (DNS) request; and direct a second portion of the outgoing traffic to the native IP stack.

20 Claims, 16 Drawing Sheets

(56) References Cited

U.S. PATENT DOCUMENTS

| | | | |
|---|---|---|---|
| 2011/0191455 A1* | 8/2011 | Gardner | H04L 61/4511 |
| | | | 709/223 |
| 2013/0254425 A1* | 9/2013 | Broerman | H04L 61/5076 |
| | | | 709/238 |
| 2015/0020188 A1* | 1/2015 | Segal | H04L 63/0245 |
| | | | 726/13 |
| 2018/0159825 A1* | 6/2018 | Segal | H04L 63/20 |
| 2018/0309658 A1* | 10/2018 | Parla | H04L 12/4641 |
| 2019/0132288 A1* | 5/2019 | Li | H04L 63/0245 |
| 2019/0372937 A1* | 12/2019 | Song | H04L 63/029 |

* cited by examiner

SPLIT TUNNEL-BASED SECURITY

CROSS-REFERENCE TO RELATED APPLICATIONS

This application claims priority to the Indian Provisional Application 202041018806 entitled "Split Tunnel-Based Security," filed 2 May 2020, which is incorporated herein by reference.

FIELD OF THE SPECIFICATION

This application relates in general to computer security, and more particularly, though not exclusively, to a system and method for providing split tunnel-based security.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
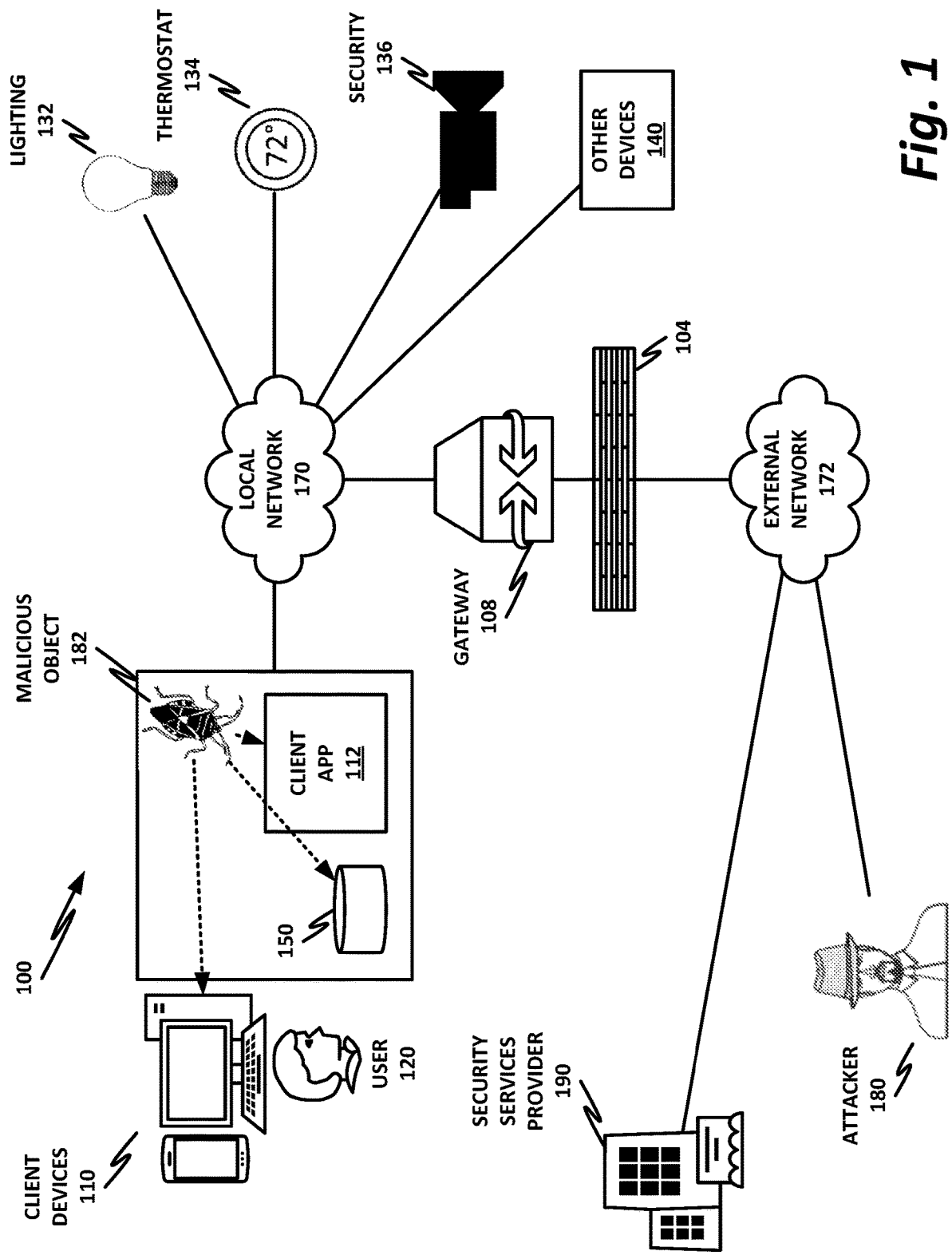
FIG. 1 is a block diagram of selected elements of a security ecosystem.

In an example, there is disclosed a computing apparatus, comprising: a hardware platform comprising a processor and a memory; a network interface; an operating system comprising a native internet protocol (IP) stack; and a security agent, comprising instructions encoded within the memory to instruct the processor to: establish a split virtual private network (VPN) tunnel with a remote VPN service; receive outgoing network traffic; direct a first portion of the outgoing traffic to the VPN tunnel, comprising determining that the first portion includes an outgoing domain name service (DNS) request; and direct a second portion of the outgoing traffic to the native IP stack.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

So-called closed operating systems present novel challenges for a security services vendor. In a traditional open operating system, the security service vendor can provide a security agent to the client. The security agent runs with elevated privileges, such as administrator, root, or ring 0, 1, or 2 privileges on the operating system.

With these elevated privileges, the security agent can inspect other processes, scan objects, monitor network traffic, and provide many other security mechanisms to protect the device from malware, spyware, adware, viruses, and other threats.

In a closed operating system, this is not always possible. Closed operating systems run each application in its own dedicated sandbox environment. This means that, in a closed operating system, applications do not have visibility into one another, and have no ability to scan or modify other applications. Without the ability to scan objects and monitor applications, the functions of a security agent on a closed operating system are severely limited. Examples of popular closed operating systems include Google's Chrome OS, Windows 10 S, and Apple iOS. These closed operating systems are often employed for limited-use devices. For example, a Windows 10 S device runs a stripped-down version of Windows 10 that provides more limited functionality than the full version. Chrome OS is popularly used on ultra-lightweight laptops that provide primarily networked or online applications. Apple iOS is used on Apple iPhones and iPad devices.

Proprietors of these closed operating systems claim that traditional security agents are not necessary on a closed operating system. This is because the closed operating system does not permit unregulated or unsupervised installation of applications. Rather, on the closed operating system, users must receive all applications from a so-called "app store." The app store is generally operated by the proprietor of the closed operating system, and applications are generally required to undergo a verification process before they are made available on the app store.

However, even with this verification process in place, app stores do not provide perfect security. As the number of apps uploaded to an app store can number in the hundreds of thousands or millions, providing comprehensive security scans for each app can become a challenge for the proprietor. Furthermore, even with security scans that are generally reliable, malware can work through the cracks. For example, some malware may be time activated, so that it will not exhibit its malicious behavior while being analyzed by the app store proprietor. In other cases, malware may be activated by an external signal from the operator, which will deliberately not be sent to the app store operator. In yet other examples, malware may include a set of random or semi-random triggers that are used to determine when the malicious functions should be activated. This means that the malicious functions will only be activated on a certain subset of devices, but the probability of making it through a malware scan increases.

Thus, even app stores do not provide perfect security. It is beneficial to provide a security agent that can operate on even a closed operating system. For decades, endpoint security software such as a security agent has been considered the most effective mechanism of protecting users from cybersecurity and privacy threats. Security researchers have not yet determined with confidence that a closed operating system with a closed app store is a sufficient replacement for an endpoint security solution.

As discussed above, closed operating systems provide very little scope for a third-party security agent to monitor a user's device.

One solution relies on the fact that closed operating systems are generally installed on devices that rely heavily on network operations. For example, closed operating systems may run on devices with relatively limited storage. These devices will therefore rely heavily on cloud storage solutions. Furthermore, a device such as a Google Chromebook with a closed operating system does not run traditional office software, or other traditional applications. Rather, many of the applications provided on such a device operate over the network. Furthermore, a malware author who writes malware for a closed operating system is usually not concerned with simply annoying the user or messing with the user's device. The true purpose of most malware is to mine the user's device for personally identifying information (PII) that can be sold to marketers, financial information such as bank and credit card details, passwords, and other valuable information.

Because of this ecosystem, many security functions can be provided simply by monitoring network traffic. For example, a security agent may snoop on the device's network interface and analyze traffic, either locally or via a cloud interface, to watch for suspicious network activity. When suspicious network activity is detected, appropriate remedial action can be taken.

This solution also presents novel challenges in a modern computing ecosystem. Because users and enterprises have become more security conscious, encryption technologies such as transport layer security (TLS) and secure socket layer (SSL) have become almost ubiquitous. Currently, more than 80% of internet traffic is encrypted, and this percentage is both rising and expected to approach very nearly 100% in coming years. This means that it is no longer practical for security software companies to inspect user traffic on the device and filter malicious traffic. Thus, even though the point of encrypted traffic was to protect the privacy and security of the user from prying eyes, hackers with malicious intent have actually been able to take advantage of this technology, also. They are able to hide behind the secure traffic, thus making it difficult to segregate benign traffic from malicious traffic for a security services vendor.

Furthermore, endpoint security solutions can place a burden on compute resources and network bandwidth for a protected device. This can degrade the user experience. Traditional endpoint security solutions have been able to benefit from a number of optimizations that reduce the footprint of those endpoint solutions. However, on a closed operating system, there are limited options available to the security vendor. This means that there are limited optimizations available. And even on an open operating system, it is desirable to reduce the footprint and the impact of an endpoint security solution. Thus, it is beneficial for security vendors to provide alternative mechanisms for end user and endpoint security for compute devices. One option is migrating security operations to the cloud.

When security operations are migrated to the cloud, heavy processing can be performed on the server side, where greater compute capacity may be available. One technique of providing cloud-based endpoint security is to tunnel all traffic from the client device to a cloud server. The traffic from the client device can then be subjected to inspection. This can be done even on a closed operating system.

The point of a virtual private network (VPN) is that it needs to be able to intercept all, or a subset of all, network traffic. For example, if the VPN is provided by an employer, the VPN may be required to route all traffic through the employer's servers. This can enable the employer to impose its own security protocols on network traffic, and to help ensure, for example, that enterprise data security is not compromised by users. Thus, even a closed operating system needs to provide VPNs with the ability to override the standard network stack, system-wide.

With a VPN installed, all network traffic could be tunneled to a cloud service that can inspect the network traffic for malicious activity. This provides a comprehensive security solution that can stand as a proxy for almost all security services that could be provided on the endpoint itself. With very few exceptions, a malicious application on an endpoint device will exhibit at least some malicious network traffic. This could include pinging a domain of a malware server, "phoning home," uploading or downloading data to a URL, or taking some other malicious network action.

Thus, a VPN that tunnels all network traffic to a cloud service provides nearly comprehensive device security, even on a closed operating system. One limitation to this configuration is that tunneling all traffic from every device with a large subscriber base can quickly become very burdensome on the cloud infrastructure. If millions of devices are tunneling all of their traffic through the cloud service, and every single packet coming and going from every device needs to be inspected, the cloud infrastructure can quickly become overwhelmed. This results in unnecessary consumption of bandwidth, as well as additional load and cost, on the cloud server. Furthermore, most of this scanning and monitoring is redundant. The efficiency of such an ecosystem can be improved, and the burden on the cloud infrastructure reduced, by providing a VPN with split tunneling capabilities.

A traditional technique for split tunneling is to mark certain packets of an application to selectively tunnel traffic to a cloud system. However, on a closed operating system, it may not be possible to mark selected packets from an application. Because each application is sandboxed, the security agent does not have visibility into the application.

To address this issue, an application layer level smart tunneling agent may be provided to dynamically decide if traffic needs to be tunneled to the cloud server, or not. The decision to tunnel may be made in the cloud, based on initially capturing DNS traffic only. In other words, the split tunnel routes all DNS traffic via the VPN to the cloud service, while non-DNS traffic is, by default, routed via the traditional network stack. Security decisions can then be made on the cloud, based on inspection of the DNS traffic. In some cases, the cloud server may determine that it is desirable to tunnel a particular socket through the cloud service. For example, if the security agent determines that the device is connected to a public wireless access point (WAP), such as an airport or coffee shop, and further determines via the DNS traffic that the user is logging on to an online banking service, it may be desirable to capture the socket for those banking transactions and tunnel all traffic for that socket through the VPN. In this case, it may not even be necessary to inspect every packet for security purposes, but rather, the tunneling can provide beneficial security when the user is connected to a poorly secured or unencrypted WAP. Other customized actions may be taken based on DNS traffic, in addition to the example of tunneling a particular socket through the VPN. For example, a user could optionally be redirected from a mistyped domain name to the correct domain name, a particular domain name or URL could be identified as malicious and blocked, a domain name with a high privacy risk could require user verification before connecting, or other action could be taken.

This mechanism provides a nearly comprehensive security solution on even closed operating systems, while reducing the compute burden on the endpoint, and also reducing the demand on cloud resources. This provides a simplified mechanism to enforce policies on the cloud, where decisions can be made about whether to block, tunnel, modify, or otherwise act on particular traffic. This can be based on initially tunneling only DNS queries.

In some cases, this rich functionality can be provided via EDNS (extensible DNS). Traditional DNS transactions are limited to 512 bytes of data. EDNS provides a mechanism to extend traditional DNS traffic. With EDNS, an additional payload can be added to the DNS transaction.

In some existing cases, EDNS is used on the sender end to provide additional information from the endpoint. However, in some embodiments of the present specification, EDNS is used on the response side. DNS queries are tunneled via the cloud service, and the cloud service can forward the DNS requests to an appropriate DNS resolver. The cloud service may also query a database for information about the domain name. For example, MCAFEE, LLC operates a global database known as global threat intelligence (GTI™). GTI includes global reputation for millions of domain names and URLs, based on telemetry collected from millions of installed endpoints and from analysis of URLs and webpages. GTI currently provides a three-tiered reputation for a domain name or URL (e.g., red, yellow, green, or alternatively, white, grey, black). A cloud security service of the present specification may provide a similar database, and may also provide additional information, such as the nature of the URL, whether the URL requires sensitive data (e.g., a banking website), valid certificates for known URLs, identity of typo domain squatters, and other rich information that may be correlated or associated with DNS queries.

Once the cloud service has received the correct IP address for a DNS query, the cloud service may provide the DNS response in an EDNS format. On the endpoint, the security agent operating the split VPN receives the DNS response and parses out the rich data from the EDNS query. The EDNS rich data may include instructions for the security agent on the endpoint. Assuming that no special action needs to be taken and the URL has a good or safe reputation, the split VPN may simply forward the actual DNS response from the EDNS packet to the requesting application, and then permit all remaining traffic on that socket to pass through the normal IP stack. If special or remedial action does need to be taken, then the security agent can take appropriate action, such as dropping the packet, closing the socket, warning the user, asking for verification, or taking some other remedial action.

Embodiments of the present specification use the concept of a smart split tunnel to redirect traffic to a cloud server. On the cloud VPN server, based on the subscription policy for the user, traffic may be subjected to further inspection.

One difference between this embodiment and other split tunneling and cloud inspection techniques is that this embodiment initially tunnels only the DNS traffic to the cloud VPN server. The cloud VPN server may host a DNS proxy, which examines the domain and gets its category reputation score from a cloud service similar to GTI.

The cloud VPN service may then use the domain category, reputation score, and other data received from the cloud, in addition to user or enterprise-specific policies, to decide whether the traffic is unsafe, an advertisement, legitimate, not allowed, or otherwise should be handled per policy.

If the domain category is sensitive (e.g., finance or social media), where it is advantageous to provide the user with additional privacy and security, the DNS response to the client may carry an additional EDNS payload that instructs the smart tunneling agent on the client to tunnel all traffic on that socket to the resolved destination of the VPN server.

Similarly, if the traffic is for unsafe, advertisement, or other undesirable domains, the DNS proxy may use the additional EDNS payload to warn the smart tunneling agent on the client, and/or the user, to request confirmation or other action before completing the connection.

In another example, if the DNS request matches a domain generation algorithm (DGA) domain, a typo squatter domain, or other similar domain, the DNS request may be dropped. The DNS proxy may then use the EDNS payload in the DNS response to instruct the smart tunneling agent on the client to notify the user of a possible mistake in the domain name. The user may then be given an option to either go to the assumed correct domain name, or to proceed to the mistyped domain name.

If the domain has known privacy issues, such as in how the service stores its data, encryption standards, a past security breach on that domain, or undesirable terms and services, the DNS proxy may use the EDNS payload in the DNS response to instruct the smart tunneling agent to notify and warn the user about the possible risk associated with the domain. For example, the smart tunneling agent could help the user understand risks associated with storing his private data on a risky or unsecured file sharing service that has had previous data losses. In another example, the cloud service may indicate that the domain is for a cloud storage or file sharing service (e.g., "sketchyshare.com") that has questionable terms of service. For example, some less than reputable file sharing sites include terms of service in which the network operator claims ownership of, or a license to use, any of the user data uploaded to the cloud service. Thus, if the user attempts a login to sketchyshare.com, the EDNS payload may include a warning to the user of these possibly undesirable terms. The smart tunneling agent may then request verification from the user before completing the connection. This can help protect the user from a risky file sharing service, or from opening an account that might possibly leak or otherwise compromise his identity.

If the traffic is for an unknown domain category, the DNS proxy may use the EDNS payload that resolved the destination to the VPN server for further inspection. The VPN server on the cloud, which may host multiple inspection engines, may check the subscription status of the user, or the user's enterprise or personal policy. The cloud service may then redirect the traffic to the various inspection engines for further inspection, if appropriate. This reduces the footprint of the client install of the security agent, while also making it easier to scale and add new features to the security solution, without the user needing to install a new security agent or update the client frequently.

At a more abstract level, the teachings of the present specification provide a VPN smart tunneling agent that initially tunnels all DNS traffic from the client device to a cloud VPN server. The cloud VPN server inspects the DNS traffic and, depending on the client's security subscription and/or personal or enterprise settings, may take action. This could include resolving the reputation of domains such as those received from a threat intelligence service, sending additional responses back to the client via EDNS, or taking other action.

In an example, an EDNS response may indicate at least one of the following options:
1. Access to the domain was blocked, and the reason for blocking. Example: access to the malicious domain "romz.de" was blocked because the threat intelligence server reputation score for this domain was bad (e.g., red or black list).
2. Access to the domain was blocked because the domain matches a possible phishing site with few noticeable typos or spelling mistakes.
3. All traffic to the domain needs to be tunneled, and the reason for tunneling. Example: access to domain "user-bank.com" was tunneled because the category for this domain was Finance.
4. Traffic to the domain should bypass the tunnel, and the reason for bypassing. Example: traffic to the domain "youtube.com" was bypassed because this is a content streaming site that should not be tunneled (e.g., because it will consume significant bandwidth for very little benefit).

The response received can then be used by the VPN smart tunneling agent to notify the user of the security posture of the domain, as well as any action taken on the traffic.

Embodiments of the present specification provide a smart tunneling agent that sits on a client device with a closed operating system. The smart tunneling agent may identify which traffic needs to be tunneled.

Embodiments of the present specification also provide a mechanism and algorithm used in arriving at the decision to allow, block, tunnel, or notify the user of a possible security and/or privacy risk.

Embodiments of the present specification also include a technique or method used to initially tunnel all DNS traffic to the VPN cloud, including an EDNS response to communicate to the client about a decision to block, allow, tunnel, or take some other decision on the traffic. The response may also include the reason for taking the decision or performing the action.

Embodiments of the present specification also provide a method of managing the inclusion and exclusion list of IPs on the smart tunneling agent for best and most cost-effective tunneling.

In various embodiments, split tunneling may be achieved using multiple techniques. In one example, application packet marking may be used on the client to tunnel specific application traffic. In another example, differential tunneling may be used, based on quality of service (QoS) requirements. In another embodiment, blacklist and whitelist-based tunneling may be used, wherein the VPN server explicitly specifies an IP address or IP address range for which traffic needs to be tunneled or not tunneled.

In another example, tunneling may be based on port number. For example, the VPN tunnel may capture all traffic on port 53, commonly used for DNS queries. In cases where traffic for a particular application is to be tunneled based, for example, on domain name or IP address (e.g., the case of a banking website), then the split tunneling server may capture all traffic on that port, and forward all traffic on other ports to the traditional IP stack.

In some cases, these methods may require additional low-level support from the operating system to manipulate the packets. In other cases, these techniques may be highly static in nature, because of the use of fixed IPs or a set of IPs.

While these split tunneling techniques are prevalent, not all of them work well on closed operating systems like Chrome OS or Windows 10 S. Thus, the use of EDNS response packets to dynamically configure smart VPN clients to tunnel traffic to specific domains is beneficial. These decisions may be based on domain name category (e.g., as retrieved from a cloud service similar to GTI), domain name, reputation score, and user or enterprise-specific policies or preferences.

Embodiments of the present specification use the EDNS response as an interface to communicate domain-specific information such as the sensitivity of the domain, which could be used to determine whether all traffic for the domain will be tunneled. The EDNS response may also include information such as the type of domain (e.g., advertisement domain, or other categories, such as sports, news, social networking, and others). These domain categories could be used to enforce enterprise, personal, and/or family domain filtering preferences. An EDNS response may also include the reason for blocking a domain if the domain is blocked, such as that the domain is potentially unsafe, may be a typo squatter domain, or is otherwise undesirable.

Because the system of the present specification dynamically decides which traffic to tunnel and which not to tunnel, this solution is highly extensible and straightforward to modify and update. Furthermore, in the absence of operating system-level support for per-application packet marking and dynamic routing changes, this solution presents a straightforward and effective alternative that is independent of any complex platform-level dependencies. Additionally, parsing EDNS responses is much simpler to implement at an application layer than marking packets for and configuring QoS parameters, which provides it deeper operating system-level features.

In some embodiments, this solution also ensures that good website traffic, unsensitive traffic, and more QoS-sensitive traffic is not tunneled. This reduces the latency for end users, thus improving system efficiency and reducing cost of the cloud infrastructure.

The system of the present specification provides cybersecurity and privacy to clients running on closed operating systems that, at most, allow a VPN client to be installed. Traditionally, a VPN solution may be used to encrypt traffic from client devices, so that user traffic is protected from eavesdropping on an unsecured network. In the present system, along with the user's privacy protection, the system also protects the user from malicious online content.

In embodiments of the present specification, the VPN not only helps to protect the user's privacy, but also helps to protect the user from malicious online content. User protection can be provided by tunneling sensitive traffic to a VPN server on a selective basis, based for example on the category and reputation of an accessed domain, and/or a user or enterprise profile or preferences. Once the traffic has been inspected and an inspection verdict is generated (e.g., allow, block, warn, or similar), similar traffic from other devices may be classified using the same verdict without having to tunnel it again to the VPN server for a specific amount of time. This amount of time may be user-configurable, and may be on the order of, for example, one day, one week, or some other timeframe. This can help to further reduce both the footprint and the impact of the VPN agent.

Embodiments of the present specification include four interworking components:

1. A cloud server is capable of redirecting specific types of traffic and performing additional packet processing. The additional packet processing may be performed by inspection engines based on a user's subscription, and/or a user or enterprise configuration or policy.
2. A cloud-based rich reputation service provides reputations for URLs and domain names. This can include both security reputations and other metadata, such as the category of the service, which can be used for filtering purposes, or for purposes of tunneling traffic (e.g., traffic in the Finance category is tunneled).
3. A containerized, pluggable framework that supports the functionality of adding multiple L3/L4 and L7 inspection engines. A first plug-in is a DNS proxy plug-in that monitors the DNS traffic from the clients, and performs the domain category and reputation check. This check can be performed by querying the cloud-based rich reputation service. The DNS proxy may block domains with bad reputations and send additional information to the client about sensitivity. This can include decisions to tunnel or not, the domain type (Advertisement, Finance, or similar), and reason for blocking, if any (e.g., unsafe, typo squatter, or similar). The additional information described above may be communicated to the client by attaching an additional EDNS payload into the DNS response sent back to the client.
4. A smart tunneling agent (VPN client) on the endpoint. This may include an EDNS parser, and an IP exclusion and inclusion list manager. The smart tunnel may also be capable of updating this list, based on updated information from the VPN server supporting a management interface for a VPN client and server control information exchange.

A system and method for providing split tunnel-based security will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. Client devices 110 may include, for example, mobile devices with closed operating systems, which may limit the ability of security agents to monitor those devices. In embodiments with closed operating systems, it may be desirable to provide on the endpoint devices a security module that provides split tunneling, according to the teachings of the present specification.

A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. In some cases, gateway 108 could be modified to provide split tunneling capabilities. For example, even if client devices 110 do not have built-in security modules, gateway 108 could provide split tunneling for DNS requests to provide security and privacy services for client devices 110. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
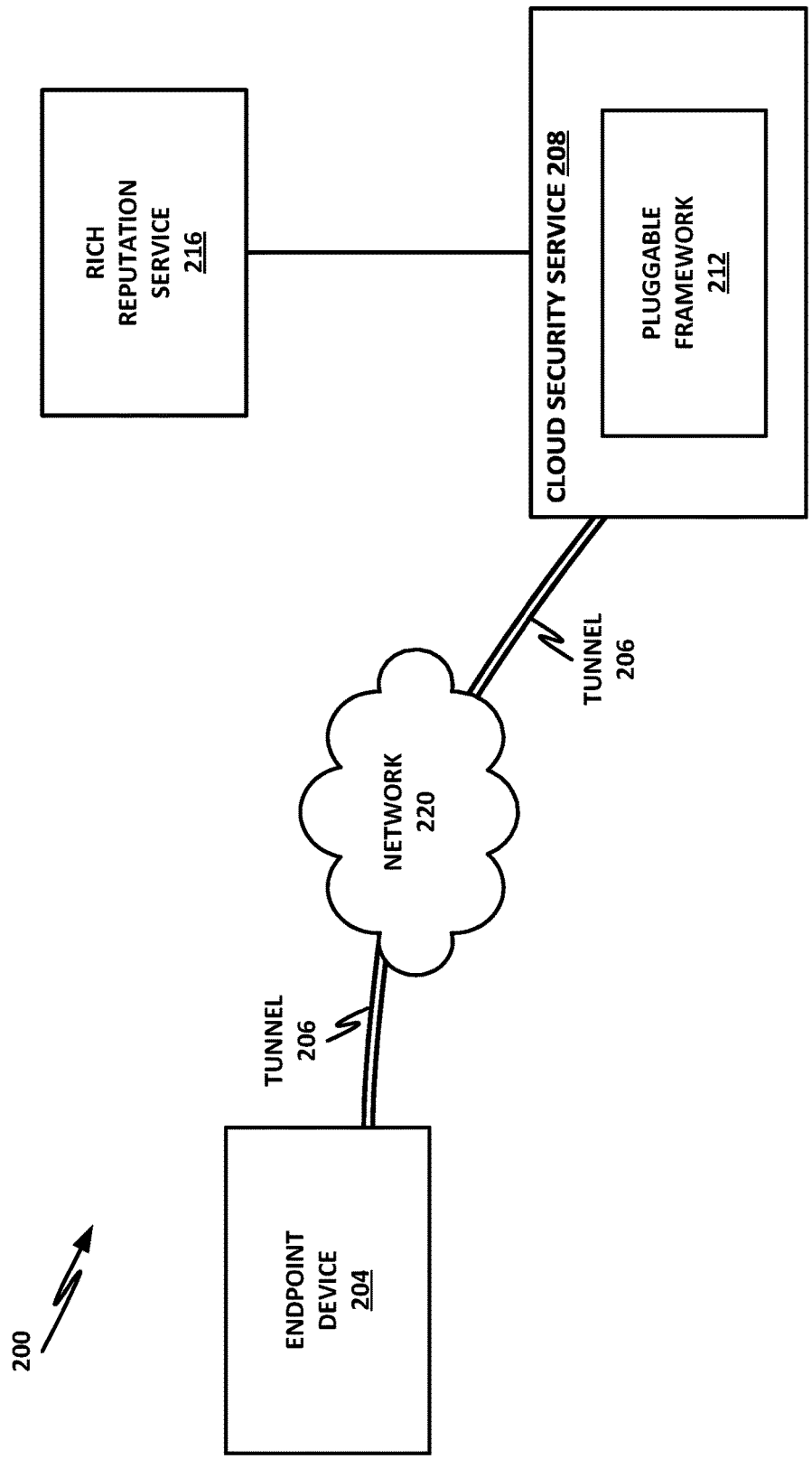
FIG. 2 is a simplified block diagram of an ecosystem.

FIG. 2 is a simplified block diagram of an ecosystem 200. In some cases, ecosystem 200 could be considered to be a simplification of ecosystem 100 of FIG. 1. However, ecosystem 200 could also be a standalone ecosystem that is separate from or that is part of ecosystem 100, or of some other ecosystem.

In this example, endpoint device 204 communicatively couples to a network 220. Network 220 communicatively couples to a cloud security service 208, that provides a pluggable framework 212. The pluggable framework can include modules or servers for performing, by way of illustrative and nonlimiting example, deep packet inspection (DPI), DLP, parental control, anomaly detection, and other features.

Also in this example, cloud security service 208 communicatively couples to a rich reputation service 216 that can provide reputation data, or other rich data, for DNS queries. For example, the GTI service provided by MCAFEE, LLC provides such reputation services. In some cases existing reputation services, including those provided by GTI, could be supplemented with additional reputation data, as illustrated herein.

Endpoint device 204 may establish a tunnel, which may be a split tunnel 206 with cloud security service 208.

Cloud security service 208 includes a pluggable framework 212, which may be a containerized pluggable framework that supports the functionality of adding multiple L3/L4 and L7 inspection engines, by way of illustrative and nonlimiting example.

Pluggable framework 212 may be a framework wherein inspection engines can be added in a chained fashion, and may be added dynamically in some embodiments. Depending on the user's security subscription and policy, for example, the framework may decide whether to redirect user traffic after the tunnel termination to these inspection engines. The inspection engines may monitor user traffic and act on the traffic, as per policy.

Pluggable framework 212 may include a DNS inspection engine. For the DNS inspection engine, all port 53 traffic for a subscribed user is tunneled to the VPN server. After the SSL termination, the VPN server redirects this traffic to a DNS inspection engine. The DNS inspection engine may fork the DNS request into the following parts, by way of illustrative and nonlimiting example:

Actual IP resolution, by contacting a DNS recursive server.
Retrieve a domain category and reputation via rich reputation service 216, or some other reputation service such as GTI™ provided by MCAFEE, LLC, Webroot, or similar.
Check whether the domain matches to a registered and valid phishing domain or typo squatting domain.
Check the domain against a list of known vulnerabilities. For example, by using a cloud access security broker (CASB) service such as MVISION Cloud provided by MCAFEE, LLC.

The results of the above checks may then be collated and the collective decision may be sent to the client using, for example, an EDNS response payload along with a normal DNS response.

Figure 3:
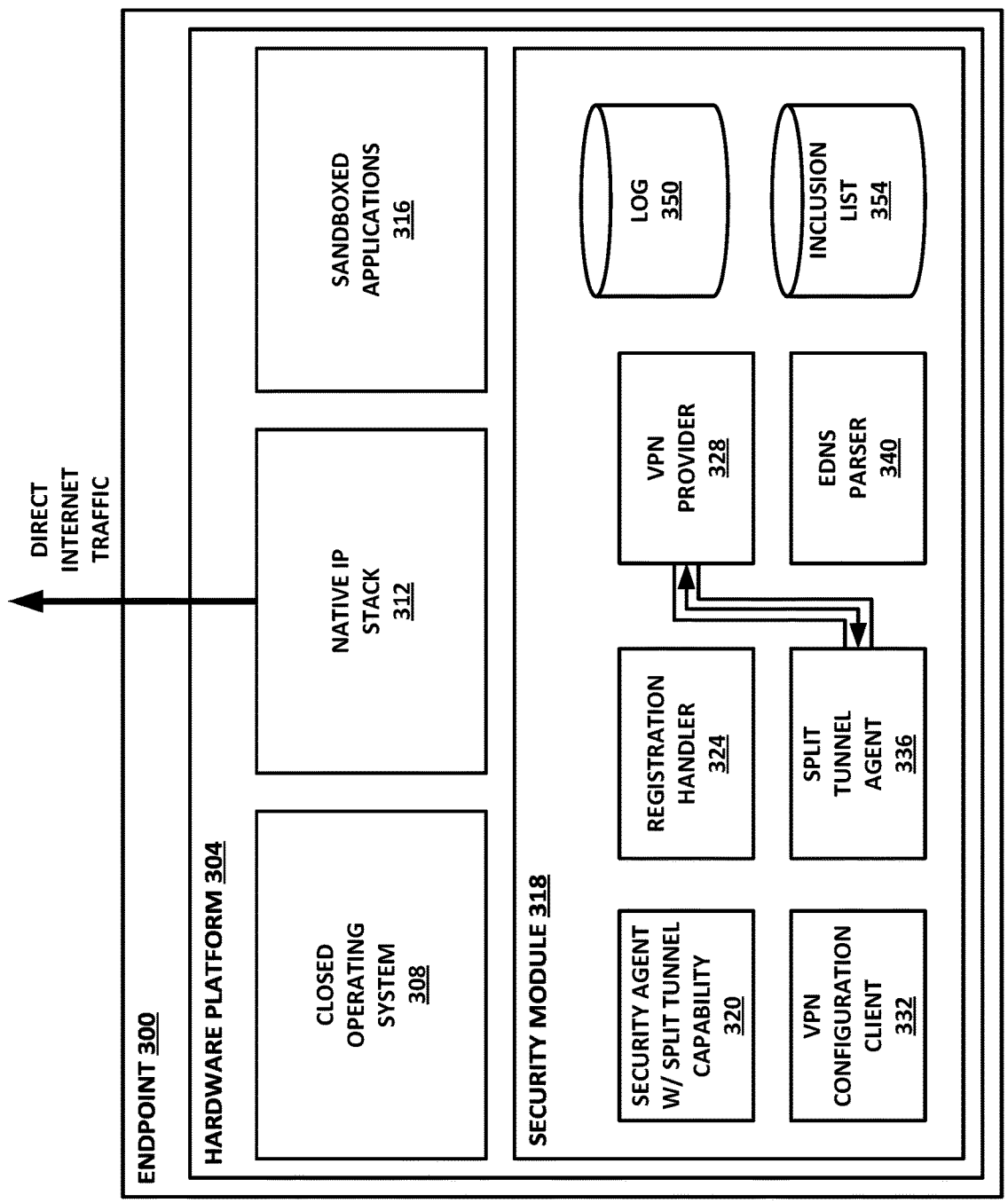
FIG. 3 is a block diagram of an endpoint.

FIG. 3 is a block diagram of an endpoint 300. Endpoint 300 is implemented on a hardware platform 304, which then provides various operative modules. The operative modules may be provided as hardware, software, firmware, or any combination of those. In a common mobile computing device, applications are provided via software, while some interfaces are provided via hardware. This is, however, an illustrative and nonlimiting example.

In the context of an overall ecosystem, endpoint 300 may be responsible for performing user registration, acquiring the current client certificate, performing tunnel set up, tunneling appropriate traffic (including port 53 traffic), EDNS parsing and tunnel exclusion/inclusion dynamic settings, traffic flow in and out of the tunnel, blocking pages for malicious sites, and providing notifications.

Figure 4:
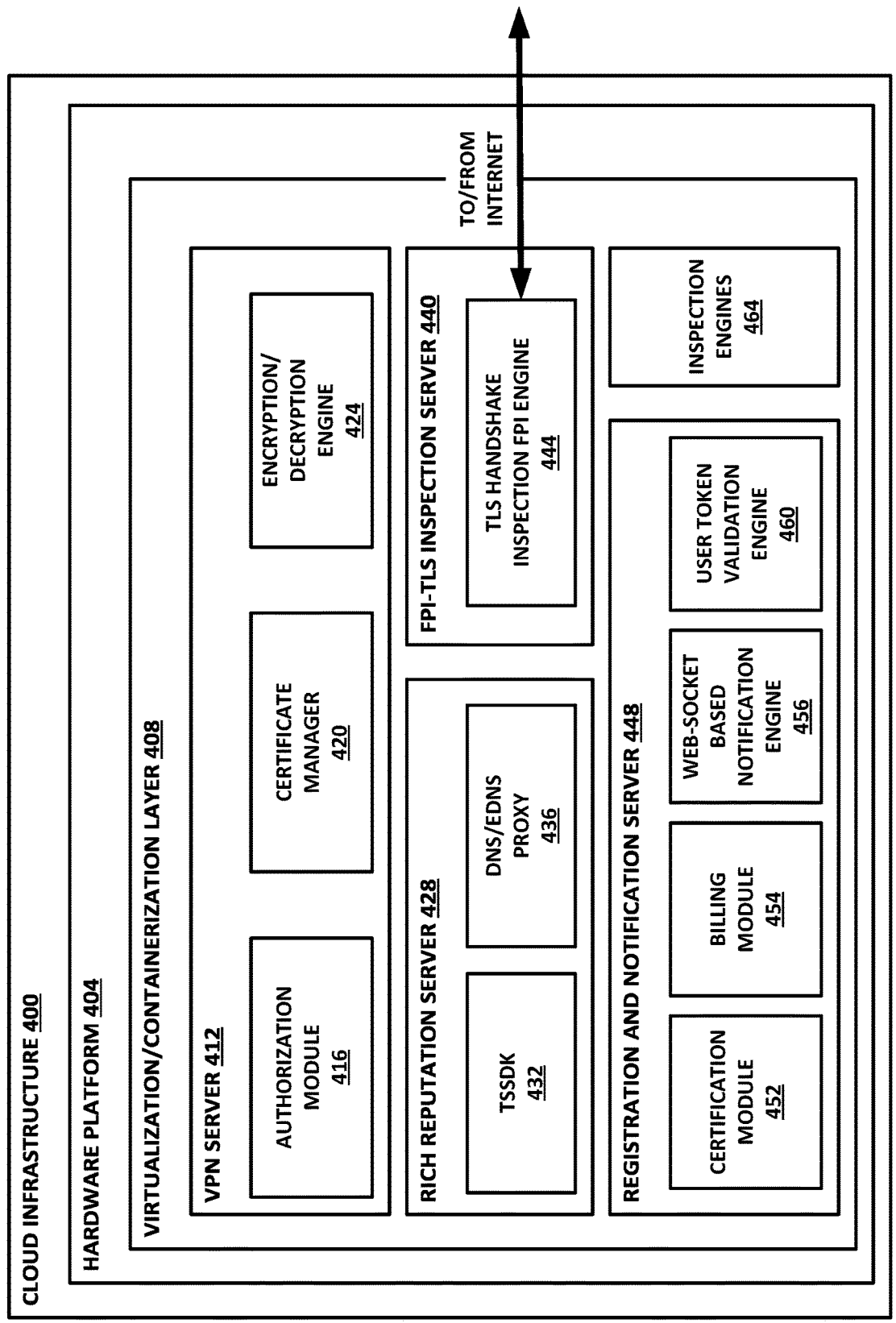
FIG. 4 is a block diagram of a cloud infrastructure.

When endpoint 300 sends a registration request, for example, to registration and notification server 448 of FIG. 4, registration and notification server 448 may perform an authentication sync up with VPN server 412 of FIG. 4. This can include VPN credentialing and certificate creation.

Registration and notification server 448 can then provide a registration success response, along with client certificates. Endpoint 300 may then perform a tunnel setup with VPN server 412, which may include always tunneling DNS traffic, such as traffic on port 53. Finally, security module 318 performs DNS forwarding to VPN server 412, which in one illustrative example is an open-connect VPN server.

In the example of FIG. 3, endpoint 300 provides a closed operating system 308, which provides a number of sandboxed applications 316. Closed operating system 308 may also provide a native IP stack 312, which may be commonly shared between operating system 308 and sandboxed applications 316. In other words, there is no need for each application to provide its own IP stack. Indeed, because the IP stack includes physical elements such as the physical interfaces, it is generally considered neither practical nor desirable for each application to provide its own independent IP stack.

Thus, even though closed operating system 308 isolates sandboxed applications 316 from one another, some security services can still be provided via IP stack 312. In particular, for endpoint 300 to be useful, particularly in many enterprise contexts, it may be necessary for closed operating system 308 to allow some applications the ability to fully or partially supplant the IP stack. This enables the creation of VPNs which may be necessary for enterprise users to protect enterprise data, or for other security purposes.

Thus, security module 318 may be an instance of a sandboxed application 316. It is therefore ordinarily restricted from directly accessing other sandboxed applications. The idea behind sandboxed applications 316 is that each application operates essentially independently of the other applications, and they cannot interfere with one another. While this can provide some security and privacy benefits, it actually interferes with the ability of security module 318 to provide system-wide security. However, because many (and perhaps even most) security threats ultimately require networking, significant security benefits can be realized when security module 318 at least partially supplants native IP stack 312.

In this example, security module 318 includes a number of subunits, including a security agent with split tunnel capability 320, a VPN configuration client 332, a registration handler 324, a split tunnel agent 336, a VPN provider 328, and an EDNS parser 340.

It is anticipated that security module 318 will operate in conjunction with a remote server that provides the actual DNS lookups and security functions. While this is a common configuration, it should be noted that it is possible for a DNS server to be provided on endpoint device 300, itself. In that case, endpoint device 300 could also include a full or partial recursive DNS database and an internal DNS server. In the more common example, where an external DNS service is used, then registration handler 324 may need to first register with the DNS service. This connects endpoint 300 to the external service with the appropriate services. This may also include checking on the user's billing and registration status, creating new accounts, updating accounts, and/or performing other common registration activities.

Once the registration handler has appropriately registered endpoint 300 with the DNS service, then a VPN configuration client 332 may communicate with a VPN server on the server side to establish a VPN tunnel with the VPN server. This VPN tunnel may initially capture all outgoing traffic from endpoint 300. However, in at least some embodiments, it is not desirable or necessary to truly VPN all network traffic. Rather, security agent 320 may, in a first or filtering phase, inspect traffic to see whether it is DNS traffic. In some cases, identifying DNS traffic may simply include checking the header of the packet to determine whether it is directed to a DNS port, such as port 53. Port 53 is the most common port used for DNS traffic, but it is also possible to have other configurations where DNS traffic is dedicated to a different port.

For any traffic that is not port 53 traffic (or in other words, traffic that does not have 53 as the destination port), the packet may be handed to native IP stack 312, which can then handle the traffic as standard or direct internet traffic.

For port 53 traffic, or other traffic that is to be handled via the VPN, split tunnel agent 336 establishes a tunnel with VPN provider 328. Any traffic that is to go through the VPN is tunneled. This is considered a split tunnel, because in at least some embodiments, not all traffic is tunneled via the VPN. Rather, only selected traffic such as DNS traffic, or other traffic that is selected as sensitive or otherwise requiring security services, is handled via the split tunnel. These packets are sent to the VPN server via the VPN provider module 328. Responses to these packets are also received via the split tunnel. Again, any packet that is not part of the tunneled traffic is handled via native IP stack 312. Traffic that is part of the tunneled traffic is handled via VPN provider 328.

If the response packet is a DNS response packet, and in particular if it is identified as an EDNS response, then EDNS parser 340 may initially handle the packet. EDNS parser 340 may inspect the packet to determine whether rich or enhanced DNS response data are present. If such data are present, then EDNS parser 340 parses out the appropriate information from the EDNS packet. Information parsed out from the EDNS packet can then be provided to security agent 320, which may act on the EDNS data according to policy.

Security module 318 is an application layer component that is supported by even closed operating system 308. It provides a simple VPN configuration client 332, with additional EDNS response parsing capabilities via EDNS parser 340. Security module 318 may also support inclusion and exclusion list altering capabilities.

A function of security module 318 is to ensure that by default, all DNS traffic from the device is tunneled to a VPN server. It incorporates a simple DNS and EDNS response parser, and based on the information received over EDNS from the cloud service, it may take various actions.

For example, security module 318 may notify the user if access to the domain was blocked, and may indicate to the user why access was blocked. It may also manage inclusion list 354 of IPs after DNS resolution. It might either add the IP to inclusion list 354, or remove the IP from inclusion list 354 (i.e., indicating that it should be tunneled or not tunneled).

Security module 318 may also notify the user if the inspection engines of the VPN cloud decided to block or reset the connection based on a flow analysis, for example, if a server was using a self-signed, revoked, or expired certificate for the TLS handshake. The flow analysis could also indicate that the flow appears to be a malware flow trying to communicate with some command-and-control server, or an inspection engine could reset the connection and notify the smart tunneling agent through a management interface, including details.

Security module 318 may also maintain a list of decisions made, including for example how many domains were blocked, how many were tunneled, and how many connections were reset. This can be used for updating log 350 and for other purposes.

FIG. 4 is a block diagram of a cloud infrastructure 400. Cloud infrastructure 400 may be responsible for providing the tunneling infrastructure to the client, and may also provision necessary client certificates to connect to the server, based on the user's subscription. Cloud infrastructure 400 may also provide a management interface for communication between the smart tunneling agent and the cloud service for any control message exchanges. Depending on the user's security subscription, the cloud service may also route traffic to a containerized inspection engine like a DNS proxy, TLS handshake inspector, or similar. These may be provided as discussed above, for example in a pluggable framework 212, as illustrated in FIG. 2. Cloud infrastructure 400 runs on hardware platform 404. While the term "hardware platform" is intended to encompass a broad category of computing devices, in the case of cloud infrastructure 400, it is more likely that hardware platform 404 will be either a server class machine, or even more commonly in contemporary usage, one or more virtual machines running in a data center. In some cases, depending on the compute needs of a particular module, this could be provided in a disaggregated infrastructure.

In cases where virtualization or other guest-host architectures are used, a virtualization or containerization layer 408 may also be provided. Virtualization or containerization layer 408 could include a virtual machine manager (VMM), hypervisor, container host, policy orchestrator, or other virtualization manager.

Although it is not necessary, it is common to provide modules such as VPN server 412, rich reputation server 428, first party isolation/transaction layer security (FPI-TLS) inspection server 440, registration and notification server 448, and inspection engines 464 as separate modules or virtual machines. While it is possible to host a plurality of such functions on a single server, within a single virtual machine, or within a single container, contemporary practice favors the separation of these various functions to provide greater modularity, less interdependence, and greater robustness. In highly modular systems, it is less likely that a problem with one will critically interfere with the other modules.

Thus, in the following description, these will be treated as separate modules, although this should be understood as an illustrative and nonlimiting example.

Registration and notification server 448 includes, in this example, a number of software modules, such as certification module 452, web-socket based notification engine 456, and user token validation engine 460. For example, user token validation engine 460 may receive authentication tokens from an end user or from an endpoint device, and may validate those authentication tokens to ensure that the user is the correct user and is properly subscribed. A certification module 452 may provision the appropriate certificates between registration and notification server 448 and the endpoint device. Certification module 452 may also provide appropriate certificates to VPN server 412, which allows VPN server 412 to engage in the appropriate secure communications with the endpoint. Web-socket based notification engine 456 may use existing web-socket infrastructure to notify the endpoint device of the registration or the attempted registration.

VPN server 412 provides the VPN infrastructure to communicatively couple with, for example, VPN provider 328 of FIG. 3. VPN server 412 provides the server-end functionality of the VPN. This includes, for example, an authorization module 416, which may receive authorization tokens from registration and notification server 448 to ensure that the user and/or endpoint are authorized to use the service. Certificate manager 420 may receive provisioned certificates, such as from certification module 452 of registration and notification server 448, or alternatively, may provision its own certificates with the endpoint device. Encryption/decryption engine 424 provides the actual encryption and decryption of traffic to provide the secure communications.

As part of its secure tunneling network traffic, VPN server 412 may need to query a rich reputation service provided by rich reputation server 428. In this example, rich reputation server 428 includes TypeScript software development kit (TSSDK) functionality 432 and DNS/EDNS proxy 436. Thus, when VPN server 412 receives a DNS resolution request from the endpoint, it may query rich reputation server 428. Rich reputation server 428 looks up the domain name via DNS/EDNS proxy 436, and may also optionally provide TSSDK services via TSSDK 432.

Optionally, VPN server 412 may also provide other inspection and security options. These may be provided via inspection engines 464. In some cases, one of these inspection engines may include an FPI-TLS inspection server 440. This could provide TLS handshake inspection via TLS handshake inspection FPI engine 444.

Inspection engines 464 may also provide other inspection services, which could be provided in a daisy chain fashion, as described in connection with pluggable framework 212 of FIG. 2.

Figure 5A:
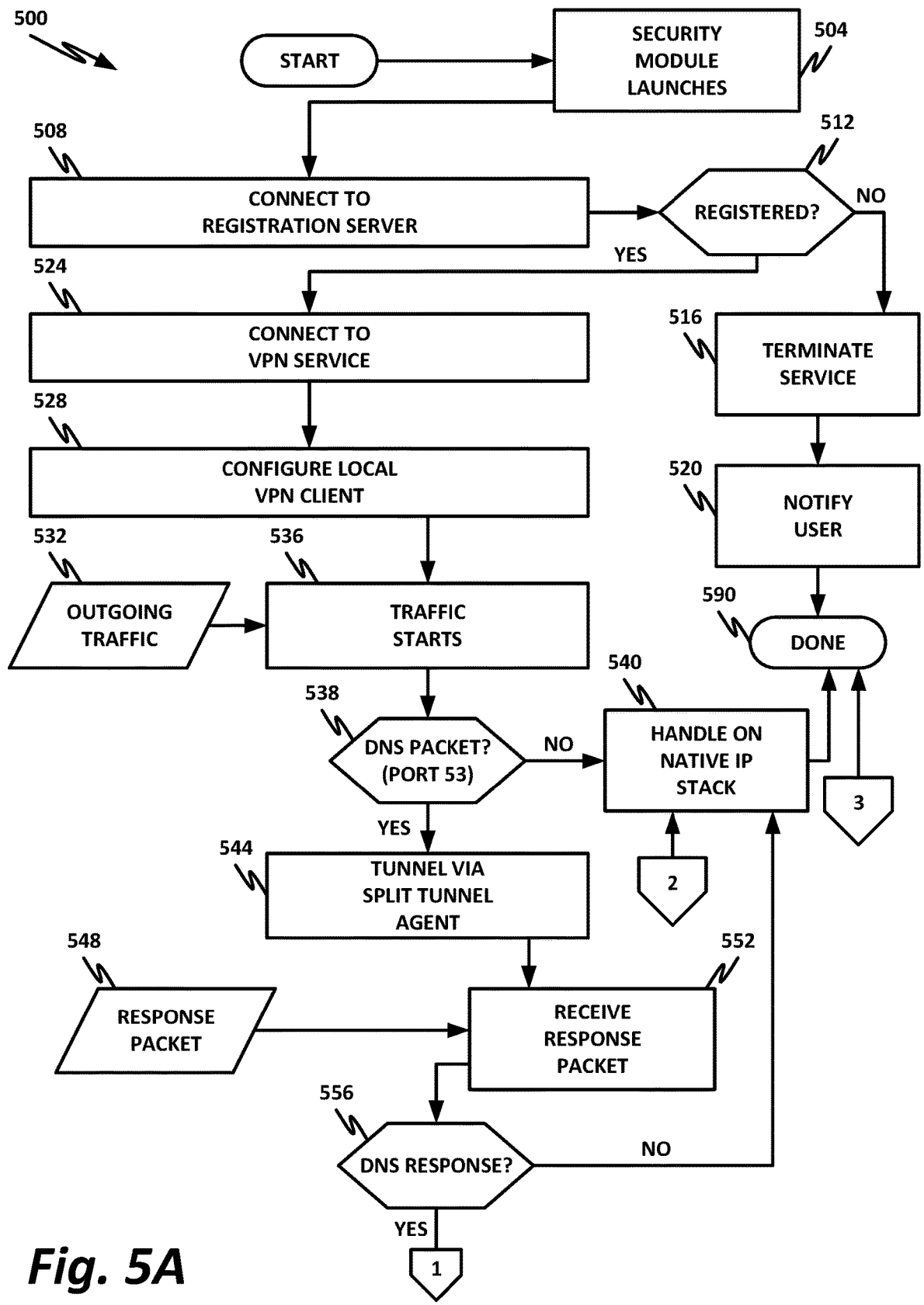
FIGS. 5A and 5B are a flowchart of a method.
Figure 5B:
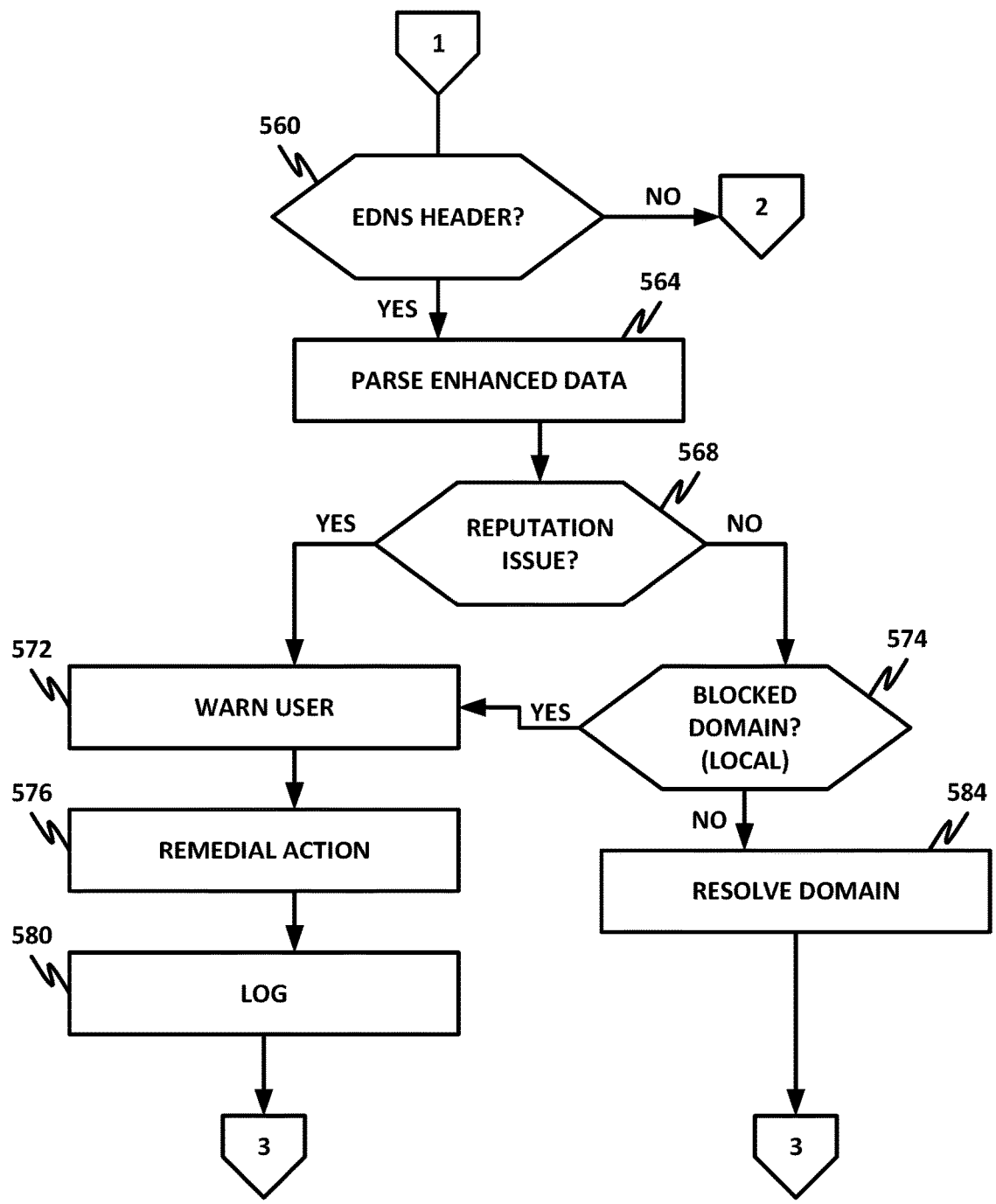

FIGS. 5A and 5B are a flowchart of a method 500. Method 500 provides an algorithm that may be implemented, for example by endpoint 300 of FIG. 3, by way by illustrative and nonlimiting example.

Starting in block 504, closed operating system 308 may launch a security module such as security module 318 of FIG. 3. In block 508, an appropriate agent of security module 318, such as registration handler 324, connects to a registration server, such as registration and notification server 448 of FIG. 4. Registration handler 324 sends to registration and notification server 448 registration or authentication credentials or tokens, as appropriate.

Registration and notification server 448 may then return to registration handler 324 an appropriate response. For example, this may indicate whether the user or the device has successfully registered, and may also include certificates, tokens, or other data that may be used to provide a secured transaction. In particular, this may include a certificate that may be used to encrypt and/or decrypt traffic in a two-directional communication.

In decision block 512, registration handler 324 determines whether the user or the device was successfully registered.

In block 516, if the registration was unsuccessful, then security module 318 may not be able to provide a useful split VPN tunnel. In that case, in block 516, the service may be terminated by security module 318.

In block 520, security module 318 may notify the user of the failed registration. This may, for example, allow the user an opportunity to update or change authentication tokens as necessary, or to complete a registration.

In block 590, the method is done.

Returning to decision block 512, if the user has successfully registered, then in block 524 an appropriate module, such as VPN configuration client 332 of FIG. 3, connects to the remote VPN service, provided for example by VPN server 412 of FIG. 4.

In block 528, VPN configuration client 332 configures a local VPN client, which may include provisioning a split tunnel via split tunnel agent 336, connecting to VPN provider 328.

In block 536, traffic begins occurring over the network connection. Security agent 320 receives outgoing traffic 532, and outgoing traffic 532 is examined by split tunnel agent 336.

In decision block 538, split tunnel agent 336 determines whether the traffic should be handled by VPN provider 328. In this illustration, the determination is based on whether the outgoing packet is a DNS packet, such as a packet being sent with a destination port of 53. It should be noted, however, that this is not the only example of traffic that may be handled via split tunnel agent 336.

For example, as described above, certain classes of sensitive or personal traffic may be handled via VPN provider 328. Thus, split tunnel agent 336 may query an inclusion list 354 to determine which traffic other than DNS traffic should be handled via the split tunnel. For the remainder of method 500, any other traffic in the inclusion list 354 may be treated similarly to an outgoing DNS packet on port 53.

If the outgoing packet is not a DNS packet or is otherwise not handled via the split tunnel, then in block 540, security agent 320 may pass the packet to native IP stack 312. Native IP stack 312 then provides a traditional IP stack algorithm, such as a traditional seven-layer IP stack, to handle the traffic.

After native IP stack 312 handles the traffic, in block 590, the method is done.

Returning to decision block 538, if split tunnel agent 336 determines that the packet is not to be handled via native IP stack 312, such as in the case of a DNS packet or traffic from inclusion list 354, then in block 544, split tunnel agent 336 tunnels the traffic via VPN provider 328. This may include optionally encrypting the packet to provide a secure DNS, although secure DNS is not necessary.

In block 552, security module 318 receives a response packet 548.

In block 556, VPN provider 328 examines response packet 548 to determine whether it is a DNS response packet, or if it is otherwise traffic intended for a connection included with inclusion list 354.

If the response is not a DNS response or is not included on inclusion list 354, then in block 540, the traffic may be handled via native IP stack 312. Flow then proceeds as previously described.

Returning to decision block 556, if this is a DNS response, or if it is otherwise traffic to be handled via inclusion list 354, then following off-page connector 1 to decision block 560, split tunnel agent 336 may determine whether the DNS packet includes an EDNS header. This EDNS header may indicate that there is additional information included with the packet, besides the ordinary DNS response.

If there is no EDNS header, then there is no additional information, and domain name resolution may proceed according to ordinary protocols. In this case, following off-page connector 2 to block 540, the traffic is handled via native IP stack 312. Control then flows as previously described.

Returning to decision block 560 of FIG. 5B, if there is an EDNS header with the DNS packet, then the header needs to be parsed.

In block 564, EDNS parser 340 parses enhanced data out from the DNS packet. In this case, the DNS response may include not only the resolution of the domain name, but also additional information such as reputation data or block list information.

Table 1 below provides example outputs of EDNS parser 340 that may be associated with various domain names. A corresponding EDNS response for each example is also provided.

TABLE 1

Example EDNS Domain Name Outputs

| Domain | GTI ™ Service Response Score | GTI ™ Service Response Category | Typo Squatting Check | CASB Service Response | IP Address Returned for DNS Proxy | EDNS Response |
|---|---|---|---|---|---|---|
| www.netflix.com | Green | Content Streaming | NONE | SAFE | 54.200.92.151 | "none" - Do NOT tunnel |
| www.netflixx.com | Grey | Unknown | Possible typo squatted domain | UNKNOWN | 65.208.97.34 | "typo-squat" - Dropped Additional EDNS parameters will include the legitimate domain |
| www.citibank.co.in | Green | FINANCE | NONE | SAFE | 192.193.218.130 | "tunnel" - Tunnel the traffic |
| www.romz.de | Red | POTENTIAL CRIMINAL ACTIVITES | — | — | 127.0.0.111 (85.236.47.218) | "unsafe" - Dropped |
| www.mega.com | Green | File Sharing | NONE | PRIVACY issues | 54.247.79.157 | "online privacy risk" Additional EDNS parameters will include the privacy risk score. End point can use this info to warn the user. |

Example EDNS responses to a "dig" request added by the DNS inspection engine on the cloud server for various domain categories include:
Financial Domain

```
; <<>> DiG 9.14.0 <<>> citibank.com @172.17.0.3 -p 53
;; global options: +cmd
;; Got answer:
;; ->>HEADER<<- opcode: QUERY, status: NOERROR, id: 43943
;; flags: qr rd ra; QUERY: 1, ANSWER: 2, AUTHORITY: 0, ADDITIONAL: 1
;; OPT PSEUDOSECTION:
; EDNS: version: 0, flags:; udp: 4096
; OPT=65001: 74 75 6e 6e 65 6c ("tunnel")
;; QUESTION SECTION:
;citibank.com. IN A
;; ANSWER SECTION:
citibank.com. 1088 IN A 192.193.218.130
citibank.com. 1088 IN A 192.193.102.175
;; Query time: 2503 msec
;; SERVER: 172.17.0.3#53(172.17.0.3)
;; WHEN: Wed Oct 30 09:08:14 IST 2019
;; MSG SIZE rcvd: 83
```

Unsafe Domain: DNS inspection drops the traffic and sends this information marked as "unsafe" in the EDNS payload. The "answer section" of the payload contains the local IP address.

```
; <<>> DiG 9.14.0 <<>> romz.de @172.17.0.3 -p 53
;; global options: +cmd
;; Got answer:
;; ->>HEADER<<- opcode: QUERY, status: NOERROR, id: 34063
;; flags: qr rd ra; QUERY: 1, ANSWER: 1, AUTHORITY: 0, ADDITIONAL: 1
;; OPT PSEUDOSECTION:
; EDNS: version: 0, flags:; udp: 4096
; OPT=65001: 75 6e 73 61 66 65 ("unsafe")
;; QUESTION SECTION:
;romz.de. IN A
;; ANSWER SECTION:
romz.de. 0 IN A 127.0.0.111
;; Query time: 2212 msec
;; SERVER: 172.17.0.3#53(172.17.0.3)
;; WHEN: Wed Oct 30 09:13:49 IST 2019
;; MSG SIZE rcvd: 62
```

Advertisement Domain: DNS inspection drops the traffic and sends response information via the EDNS response. The answer section contains the local IP address.

```
; <<>> DiG 9.14.0 <<>> adservice.google.com @172.17.0.3 -p 53
;; global options: +cmd
;; Got answer:
;; ->>HEADER<<- opcode: QUERY, status: NOERROR, id: 37518
;; flags: qr rd ra; QUERY: 1, ANSWER: 1, AUTHORITY: 0, ADDITIONAL: 1
;; OPT PSEUDOSECTION:
; EDNS: version: 0, flags:; udp: 4096
;OPT=65001: 61 64 76 ("adv")
```

-continued

```
;; QUESTION SECTION:
;adservice.google.com. IN A
;; ANSWER SECTION:
adservice.google.com. 0 IN A 127.0.0.1
;; Query time: 538 msec
;; SERVER: 172.17.0.3#53(172.17.0.3)
;; WHEN: Wed Oct 30 09:20:08 IST 2019
;; MSG SIZE rcvd: 72
```

Typo Squatted Domain: DNS inspection drops the traffic and sends response information "Tysq<legitimateddomain>" in the EDNS response. The answer section contains the local IP address.

```
; <<>> DiG 9.14.0 <<>> faacebook.com @172.17.0.3 -p 53
;; global options: +cmd
;; Got answer:
;; ->>HEADER<<- opcode: QUERY, status: NOERROR, id: 32134
;; flags: qr rd ra; QUERY: 1, ANSWER: 1, AUTHORITY: 0, ADDITIONAL: 1
;; OPT PSEUDOSECTION:
; EDNS: version: 0, flags:; udp: 4096
; OPT=65001: 74 79 73 71 66 61 63 65 62 6f 6f 6b 2e 63 6f 6d ("tysqfacebook.com")
;; QUESTION SECTION:
;faacebook.com. IN A
;; ANSWER SECTION:
faacebook.com. 0 IN A 127.0.0.1
;; Query time: 570 msec
;; SERVER: 172.17.0.3#53(172.17.0.3)
``` the client uses this information to display a warning message to the user. It should be noted that other risk information across various categories can also be passed in the EDNS response, e.g., the service risk, device risk, user risk, legal risk, cyber risk, etcetera.

```
; <<>> DiG 9.14.0 <<>> CloudBuddy.com @172.17.0.3 -p 53
;; global options: +cmd
;; Got answer:
;; ->>HEADER<<- opcode: QUERY, status: NOERROR, id: 18550
;; flags: qr rd ra; QUERY: 1, ANSWER: 1, AUTHORITY: 0, ADDITIONAL: 1
;; OPT PSEUDOSECTION:
; EDNS: version: 0, flags:; udp: 4096
; OPT=65001: 63 61 73 62 37 ("casb7")
;; QUESTION SECTION:
;CloudBuddy.com. IN A
;; ANSWER SECTION:
CloudBuddy.com. 300 IN A 69.172.201.153
;; Query time: 838 msec
;; SERVER: 172.17.0.3#53(172.17.0.3)
;; WHEN: Thu Nov 14 08:36:38 IST 2019
;; MSG SIZE rcvd: 68
```

Any Other Domain

```
; <<>> DiG 9.14.0 <<>> amazon.com @172.17.0.3 -p 53
;; global options: +cmd
;; Got answer:
;; ->>HEADER<<- opcode: QUERY, status: NOERROR, id: 41217
;; flags: qr rd ra; QUERY: 1, ANSWER: 3, AUTHORITY: 0, ADDITIONAL: 1
;; OPT PSEUDOSECTION:
; EDNS: version: 0, flags:; udp: 4096
; OPT=65001: 6e 6f 6e 65 ("none")
;; QUESTION SECTION:
;amazon.com. IN A
;; ANSWER SECTION:
amazon.com. 0 IN A 205.251.242.103
amazon.com. 0 IN A 176.32.98.166
amazon.com. 0 IN A 176.32.103.205
;; Query time: 473 msec
;; SERVER: 172.17.0.3#53(172.17.0.3)
;; WHEN: Wed Oct 30 09:21:48 IST 2019
;; MSG SIZE rcvd: 95
```

-continued

```
;; WHEN: Thu Nov 14 09:15:35 IST 2019
;; MSG SIZE rcvd: 78
```

In the above example, the user intended to browse to facebook.com, but there was an error in typing and he entered "faacebook.com," instead. The DNS inspection engine detected the domain as a typo-squat.

Thus, access was blocked and returned to the local IP to display a blocked page notification to the user. Additional information was also included in the EDNS payload regarding the possible legitimate domain "facebook.com."

Domain with very low consumer CASB scores (Privacy Risk Score): DNS inspection allows the traffic but sends info "casb7" in the EDNS response. The casb7 indicates that the consumer CASB risk score for privacy is bad for the domain. The smart tunnel agent on Along with the DNS inspection engine, additional inspection engines such as a TLS handshake inspection engine, or intrusion detection and prevention system (IDPS) engines can be chained for selective monitoring of the traffic on the cloud. The inspection framework redirects the traffic to these engines depending on the security subscription enabled for the client device.

In decision block 568, EDNS parser 340 may provide the enhanced data to security agent 320. Security agent 320 may then inspect the enhanced data to determine what action to take.

In decision block 568, security agent 320 determines whether the enhanced data indicates a reputation issue with the domain name that was resolved.

If there is no reputation issue, then in decision block 574, security agent 320 may examine the data to determine whether the domain should be blocked locally. If so, then access to the domain may be blocked, and in block 572, security agent 320 may warn the user of the blocked domain, which may include information about why the domain was blocked.

In block 576, as appropriate, security agent 320 may take some remedial action with respect to the blocked domain.

In block 580, security agent 320 may log information about the blocked domain into log 350.

Following off-page connector 3 to block 590, the method is done.

Returning to decision block 574, if the domain was not locally blocked, then the domain is allowed and there is no reputation issue. In that case, in block 584, the domain is resolved and no further issues are identified. Further traffic with this IP address that has been resolved from the domain name may in the future be handled via native IP stack 312.

Returning to decision block 568, if there is a reputation issue with the domain, then the domain may not be blocked outright, but it may at least be suspicious.

In that case, in block 572, the user is warned of the reputation issue, and there may be additional verification from the user required to proceed to the domain with the reputation issue. Thereafter, flow proceeds as previously described, and in block 590, the method is done.

Figure 6:
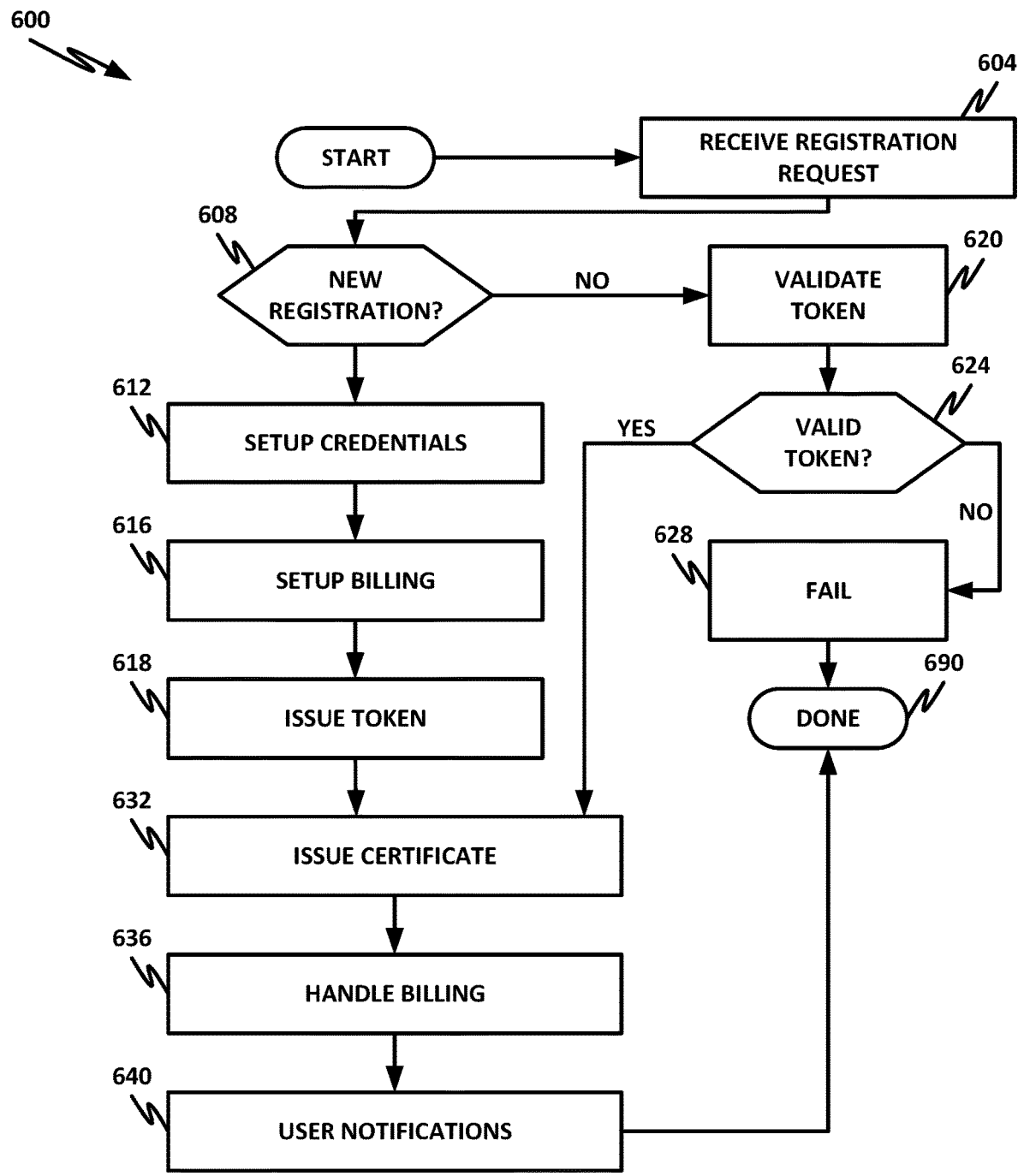
FIG. 6 is a flowchart of an additional method.

FIG. 6 is a flowchart of a method 600. Method 600 provides an algorithm that may be implemented, for example, in registration and notification server 448 of FIG. 4.

Starting in block 604, registration and notification server 448 receives a registration request.

In decision block 608, registration and notification server 448 determines whether the registration request represents a new registration.

If this is not a new registration, then in block 620, user token validation engine 416 validates the user's authentication tokens.

In decision block 624, user token validation engine determines whether the authentication tokens are valid. If they are not valid, then in block 628, the registration fails. In that case, web-socket based notification engine 456 may notify the user, and in block 690, the method is done.

Returning to decision block 624, if the authentication tokens are valid, then in block 632, certification module 452 may issue a certificate to the endpoint device that can be used for the VPN connection.

In block 636, billing module 454 of registration and notification server 448 handles billing for the end user.

In block 640, web-socket based notification engine 456 may provide user notifications to the endpoint device.

In block 690, the method is done.

Returning to decision block 608, if this is a new registration, then in block 612, certification module 452 may set up the user credentials.

In block 616, billing module 454 sets up billing for the user and the endpoint.

In block 618, user token validation engine 460 may issue validation tokens to the endpoint.

Flow may then follow block 632. As before, and in block 690, the method is done.

Figure 7:
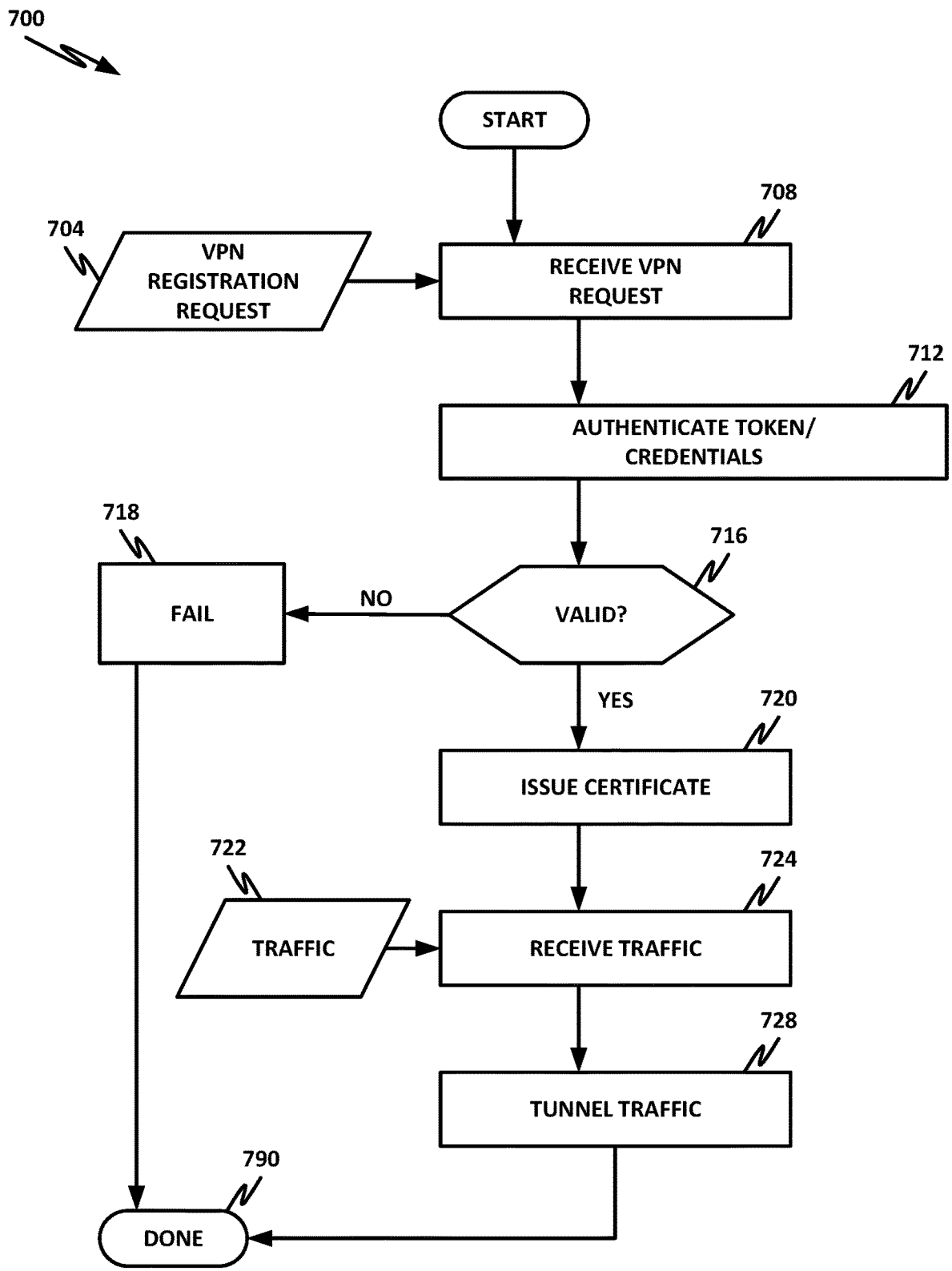
FIG. 7 is a flowchart of a further additional method.

FIG. 7 is a flowchart of a method 700. Method 700 provides an algorithm that may be implemented, for example, by VPN server 412 of FIG. 4.

Starting in block 708, VPN server 412 receives VPN registration request 704 from a user or endpoint device.

In block 712, authorization module 416 authenticates the user's authentication tokens or credentials that are provided with VPN request 704.

In block 716, authorization module 416 determines whether the tokens or credentials are valid.

If the credentials are invalid, then in block 718, registration fails and in block 790, the method is done.

Returning to decision block 716, if the credentials are valid, then in block 720, certificate manager 420 issues a certificate to the endpoint device.

In block 724, VPN server 412 receives incoming traffic 722.

In block 728, encryption/decryption engine 424 handles encryption and decryption for the traffic, depending on the direction of the flow. In this block, as part of tunneling the traffic, VPN server 412 may also query rich reputation server 428, or inspection engines 464, to receive additional information about the traffic, particularly if the traffic is DNS traffic. This may mold the response that VPN server 412 sends back to the endpoint device.

After the traffic is tunneled, in block 790, the method is done.

Figure 8:
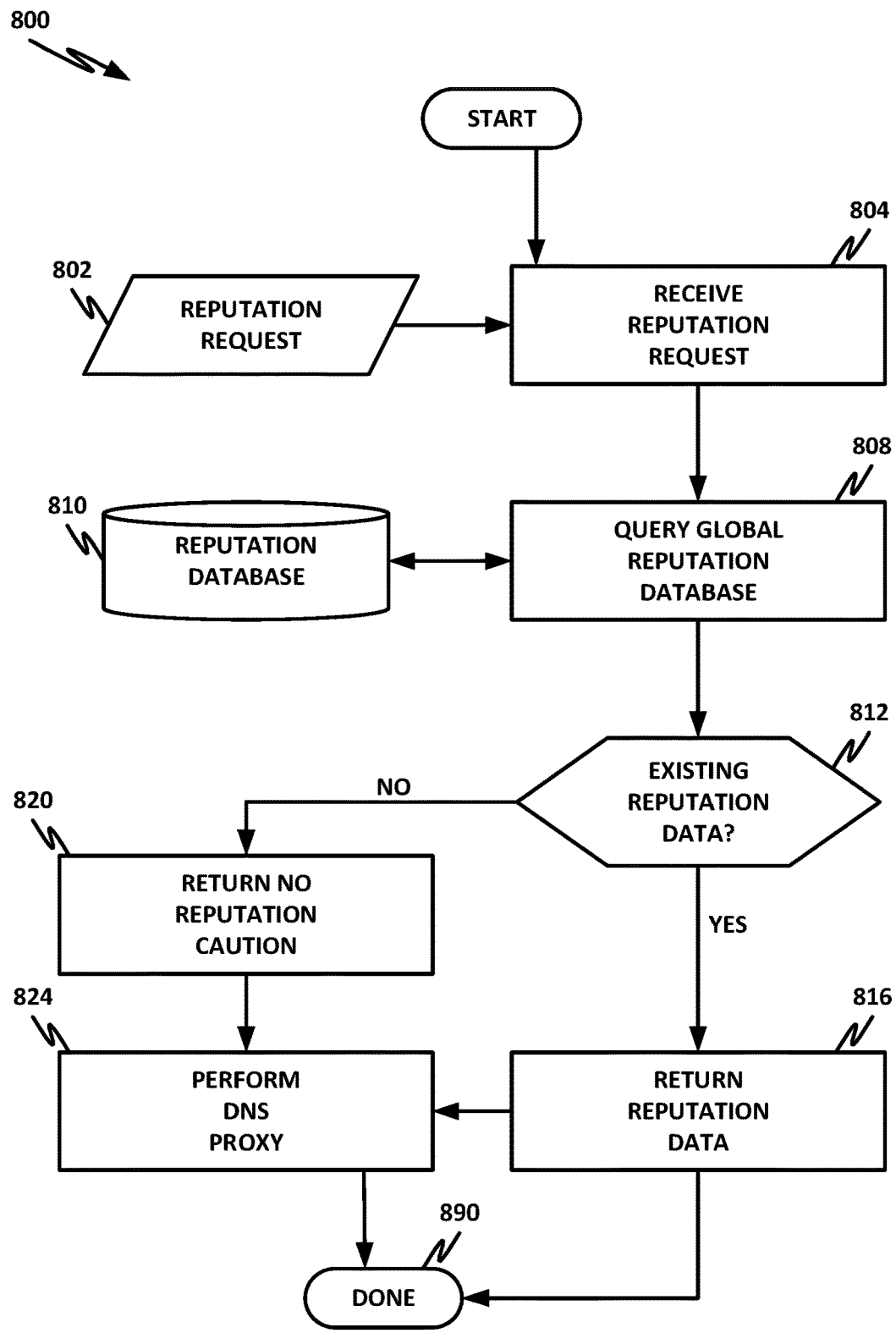
FIG. 8 is a flowchart of a further additional method.

FIG. 8 is a flowchart of a method 800. Method 800 provides an algorithm that may be implemented, for example, by rich reputation server 428 of FIG. 4.

In block 804, rich reputation server 428 receives a reputation request 802.

In block 808, based on the reputation request, TSSDK 432 queries reputation database 810 to determine whether the domain name has an existing reputation.

In block 812, if there is an existing reputation data, then in block 816, TSSDK 432 returns the reputation data.

In block 824, DNS/EDNS proxy 436 performs the DNS proxy function. This may include performing the DNS recursive lookup, and also preparing an EDNS packet that includes the appropriate EDNS data for the domain name, which may include data based on the reputation.

Returning to decision block 812, in block 820, if there is no reputation then TSSDK 432 may return a "no reputation" caution message. This may indicate that the domain name is unknown, and thus may not necessarily be trustworthy. Even though it does not have a negative reputation, caution may be necessary, because the domain name is unknown and may possibly be suspicious.

Again, in block 824, DNS/EDNS proxy 436 performs its EDNS proxy function, and in block 890, the method is done.

Figure 9:
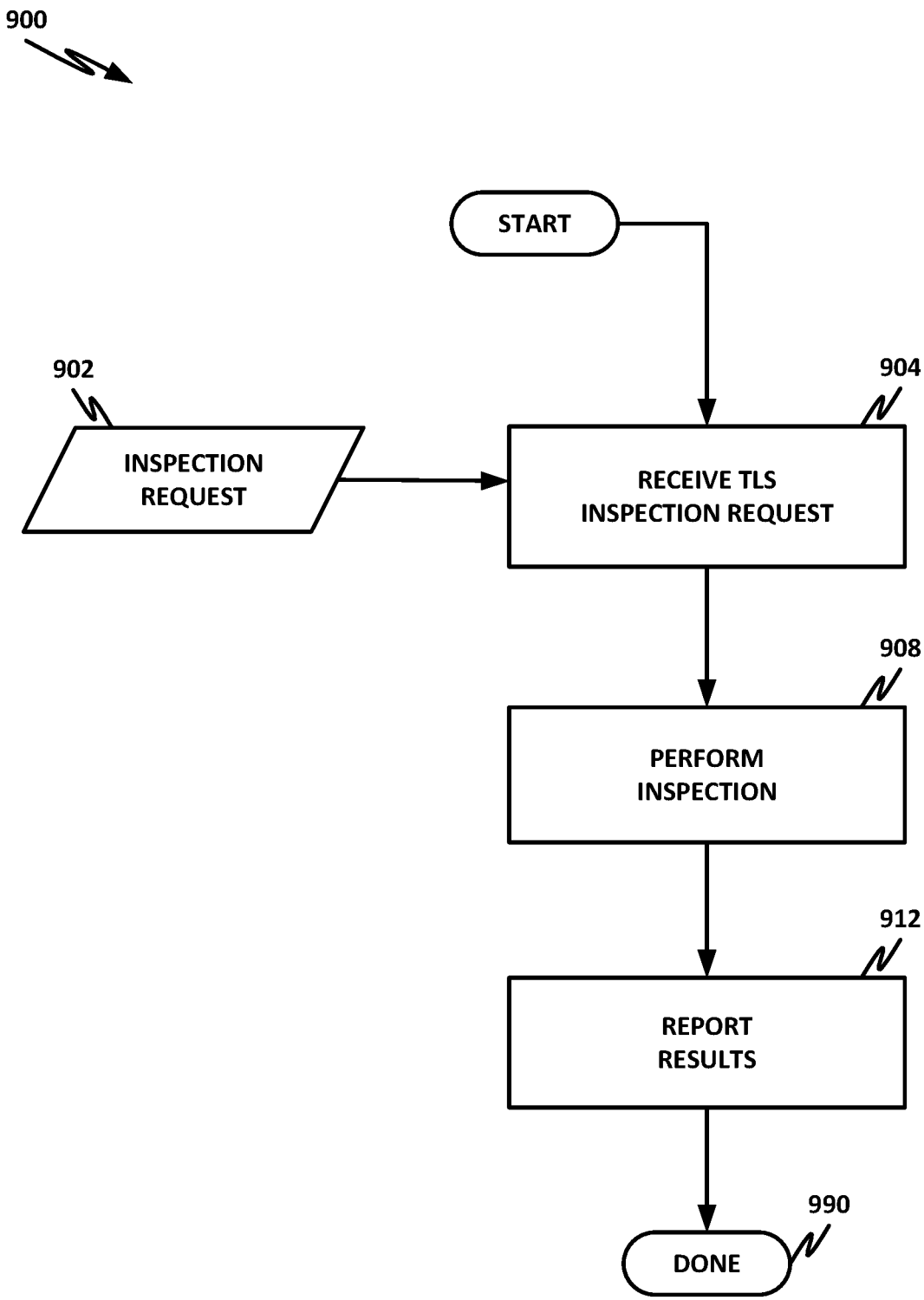
FIG. 9 is a flowchart of a further additional method.

FIG. 9 is a flowchart of a method 900. Method 900 provides an algorithm that may be implemented, for example, by FPI-TLS inspection server 440 of FIG. 4. FPI-TLS inspection server 440 is an example of an inspection engine that may be provided within inspection engine 464, which may provide a pluggable framework for inspection engines. Method 900 is provided as an example of only one such inspection engine. Many other inspection engines are possible.

Starting in block 904, FPI-TLS inspection server 440 receives inspection request 902.

In block 908, TLS handshake inspection FPI engine 444 performs the inspection. For example, TLS handshake inspection FPI engine 444 inspects the TLS handshake to determine whether the credentials of inspection request 902 are valid. If inspection request 902 originates from a server with a certificate signed by a certificate authority considered trusted, then the inspection may proceed. If inspection request 902 is from a server with a self-signed certificate, or if the certificate is from an unknown or untrusted certificate authority, the end user may be notified and may decide whether to accept the request.

In block 912, TLS handshake inspection engine 444 reports results of its inspection.

In block 990, the method is done.

Figure 10:
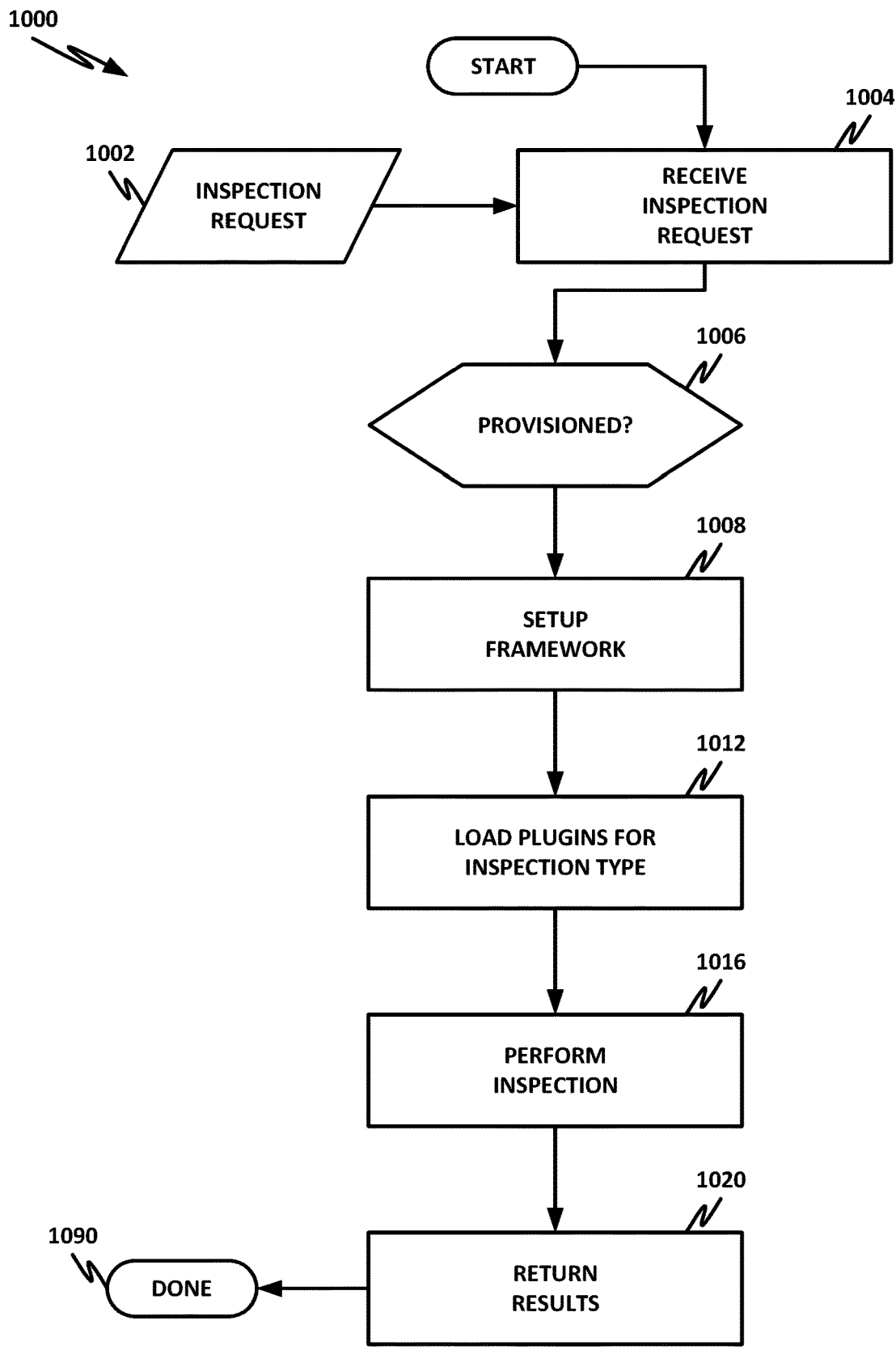
FIG. 10 is a flowchart of a further additional method.

FIG. 10 is a flowchart of a method 1000. Method 1000 provides an algorithm that may be implemented, for example, by inspection engines module 464 of FIG. 4. This provides a pluggable framework for provisioning a number of inspection engines, which may include FPI-TLS inspection server 440, and/or other inspection engines.

In block 1004, inspection engines module 454 receives inspection request 1002.

In block 1006, after receiving the inspection request, the pluggable framework determines whether the appropriate inspection module or server has already been provisioned.

If the module or server has already been provisioned, then in block 1016, the module performs the inspection.

In block 1020, the inspection module returns the inspection results.

In block 1090, the method is none.

Returning to decision block 1006, if the appropriate inspection module has not been provisioned, then in block 1008, the pluggable framework sets up the framework for the appropriate module.

In block 1012, the framework loads the plugins for the requested inspection type, and spins up the server or module to prepare it to receive the inspection request.

Then, in block 1016, the appropriate module performs the inspection and control flows as described above.

Figure 11:
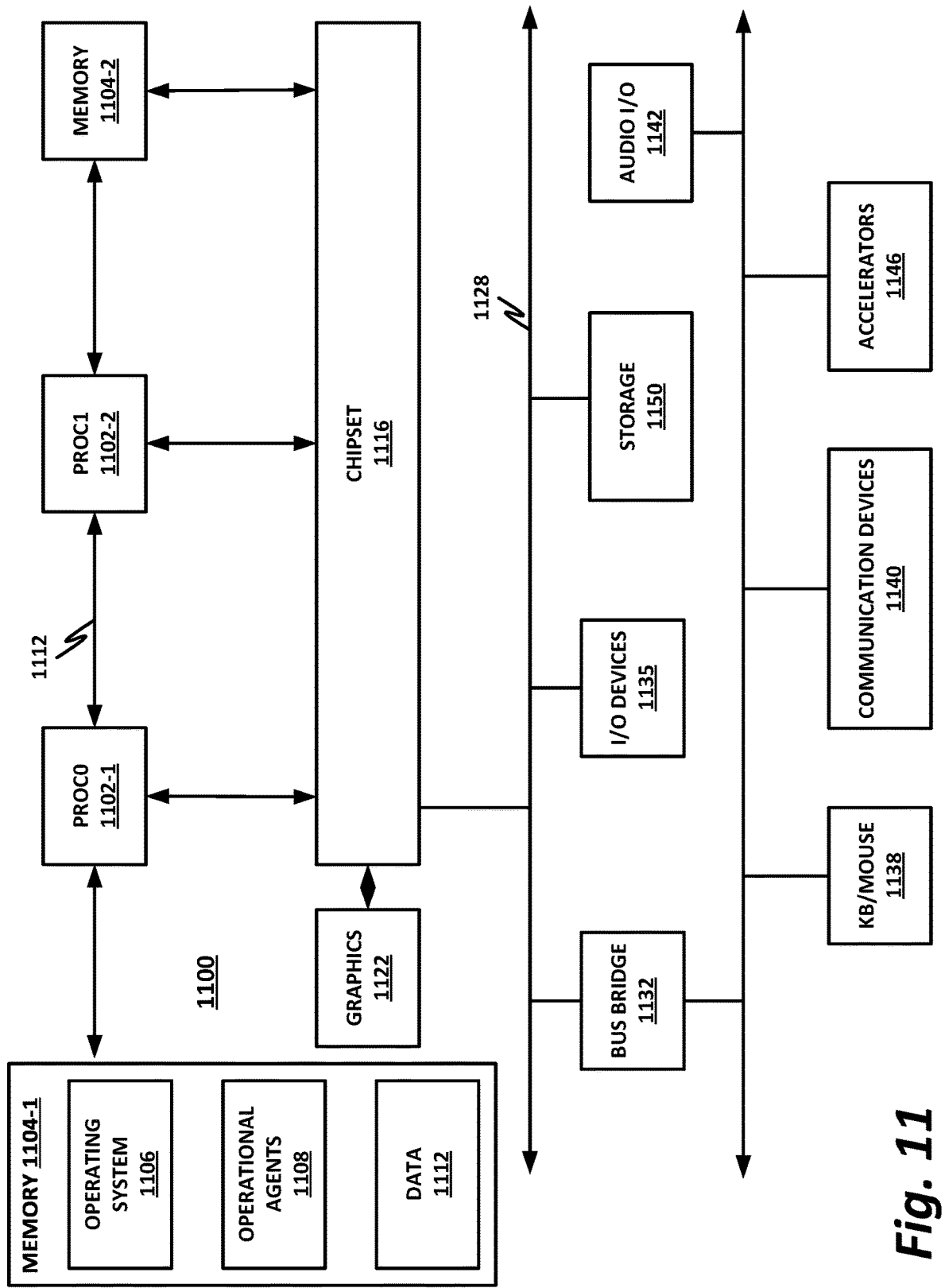
FIG. 11 is a block diagram of selected elements of a hardware platform.

FIG. 11 is a block diagram of a hardware platform 1100. In at least some embodiments, hardware platform 1100 may be configured or adapted to provide split tunnel-based security, substantially as described in the present disclosure.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1100, even though they may be scattered across a data center, or even located in different data centers.

Hardware platform 1100 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1100 is arranged in a point-to-point (PtP) configuration. This PtP configuration is popular for personal computer (PC) and server-type devices, although it is not so limited, and any other bus type may be used.

Hardware platform 1100 is an example of a platform that may be used to implement embodiments of the teachings of this specification. For example, instructions could be stored in storage 1150. Instructions could also be transmitted to the hardware platform in an ethereal form, such as via a network interface, or retrieved from another source via any suitable interconnect. Once received (from any source), the instructions may be loaded into memory 1104, and may then be executed by one or more processor 1102 to provide elements such as an operating system 1106, operational agents 1108, or data 1112.

Figure 13:
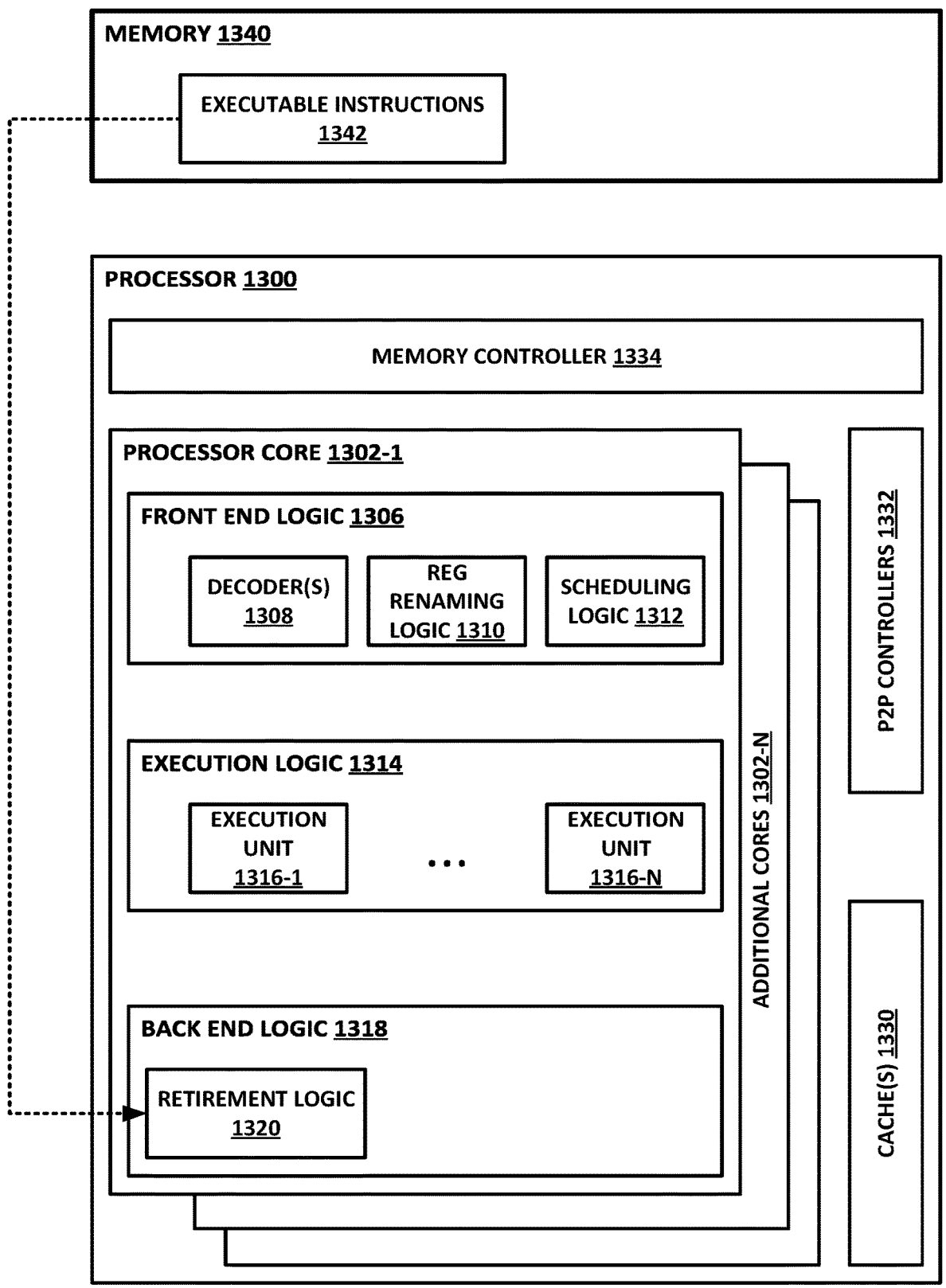
FIG. 13 is a block diagram of selected elements of a processor.

Hardware platform 1100 may include several processors 1102. For simplicity and clarity, only processors PROC0 1102-1 and PROC1 1102-2 are shown. Additional processors (such as 2, 4, 8, 16, 24, 32, 64, or 128 processors) may be provided as necessary, while in other embodiments, only one processor may be provided. Details of processors 1102 are not illustrated in this FIGURE, but one embodiment is illustrated in FIG. 13. Processors may have any number of cores, such as 1, 2, 4, 8, 16, 24, 32, 64, or 128 cores.

Processors 1102 may be any type of processor and may communicatively couple to chipset 1116 via, for example, PtP interfaces. Chipset 1116 may also exchange data with other elements, such as a high performance graphics adapter 1122. In alternative embodiments, any or all of the PtP links illustrated in FIG. 11 could be implemented as any type of bus, or other configuration rather than a PtP link. In various embodiments, chipset 1116 may reside on the same die or package as a processor 1102 or on one or more different dies or packages. Each chipset may support any suitable number of processors 1102. A chipset 1116 (which may be a chipset, uncore, Northbridge, Southbridge, or other suitable logic and circuitry) may also include one or more controllers to couple other components to one or more central processor units (CPU).

Two memories, 1104-1 and 1104-2 are shown, connected to PROC0 1102-1 and PROC1 1102-2, respectively. As an example, each processor is shown connected to its memory in a direct memory access (DMA) configuration, though other memory architectures are possible, including ones in which memory 1104 communicates with a processor 1102 via a bus. For example, some memories may be connected via a system bus, or in a data center, memory may be accessible in a remote DMA (RDMA) configuration.

Memory 1104 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1104 may be used for short, medium, and/or long-term storage. Memory 1104 may store any suitable data or information utilized by platform logic. In some embodiments, memory 1104 may also comprise storage for instructions that may be executed by the cores of processors 1102 or other processing elements (e.g., logic resident on chipsets 1116) to provide functionality.

In certain embodiments, memory 1104 may comprise a relatively low-latency volatile main memory, while storage 1150 may comprise a relatively higher-latency, non-volatile memory. However, memory 1104 and storage 1150 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1104 and storage 1150, for example, in a single physical memory device, and in other cases, memory 1104 and/or storage 1150 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1122 may be configured to provide a human-readable visual output, such as a command-line interface (CLI) or graphical desktop such as Microsoft Windows, Apple OSX desktop, or a Unix/Linux X Window System-based desktop. Graphics adapter 1122 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1122 may include a hardware graphics card, which may have its own memory and its own graphics processing unit (GPU).

Chipset 1116 may be in communication with a bus 1128 via an interface circuit. Bus 1128 may have one or more devices that communicate over it, such as a bus bridge 1132, I/O devices 1135, accelerators 1146, communication devices 1140, and a keyboard and/or mouse 1138, by way of nonlimiting example. In general terms, the elements of hardware platform 1100 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1140 can broadly include any communication not covered by a network interface and the various I/O devices described herein. This may include, for example, various universal serial bus (USB), FireWire, Lightning, or other serial or parallel devices that provide communications.

I/O Devices 1135 may be configured to interface with any auxiliary device that connects to hardware platform 1100 but that is not necessarily a part of the core architecture of hardware platform 1100. A peripheral may be operable to provide extended functionality to hardware platform 1100, and may or may not be wholly dependent on hardware platform 1100. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1142 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1132 may be in communication with other devices such as a keyboard/mouse 1138 (or other input devices such as a touch screen, trackball, etc.), communication devices 1140 (such as modems, network interface devices, peripheral interfaces such as PCI or PCIe, or other types of communication devices that may communicate through a network), audio I/O 1142, a data storage device 1150, and/or accelerators 1146. In alternative embodiments, any portions of the bus architectures could be implemented with one or more PtP links.

Operating system 1106 may be, for example, Microsoft Windows, Linux, UNIX, Mac OS X, iOS, MS-DOS, or an embedded or real-time operating system (including embedded or real-time flavors of the foregoing). In some embodiments, a hardware platform 1100 may function as a host platform for one or more guest systems that invoke application (e.g., operational agents 1108).

Operational agents 1108 may include one or more computing engines that may include one or more non-transitory computer readable mediums having stored thereon executable instructions operable to instruct a processor to provide operational functions. At an appropriate time, such as upon booting hardware platform 1100 or upon a command from operating system 1106 or a user or security administrator, a processor 1102 may retrieve a copy of the operational agent (or software portions thereof) from storage 1150 and load it into memory 1104. Processor 1102 may then iteratively execute the instructions of operational agents 1108 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1100 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1100 may be virtualized, in particular the processor(s) and memory. For example, a virtualized environment may run on OS 1106, or OS 1106 could be replaced with a hypervisor or VMM. In this configuration, a virtual machine running on hardware platform 1100 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 12. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 12:
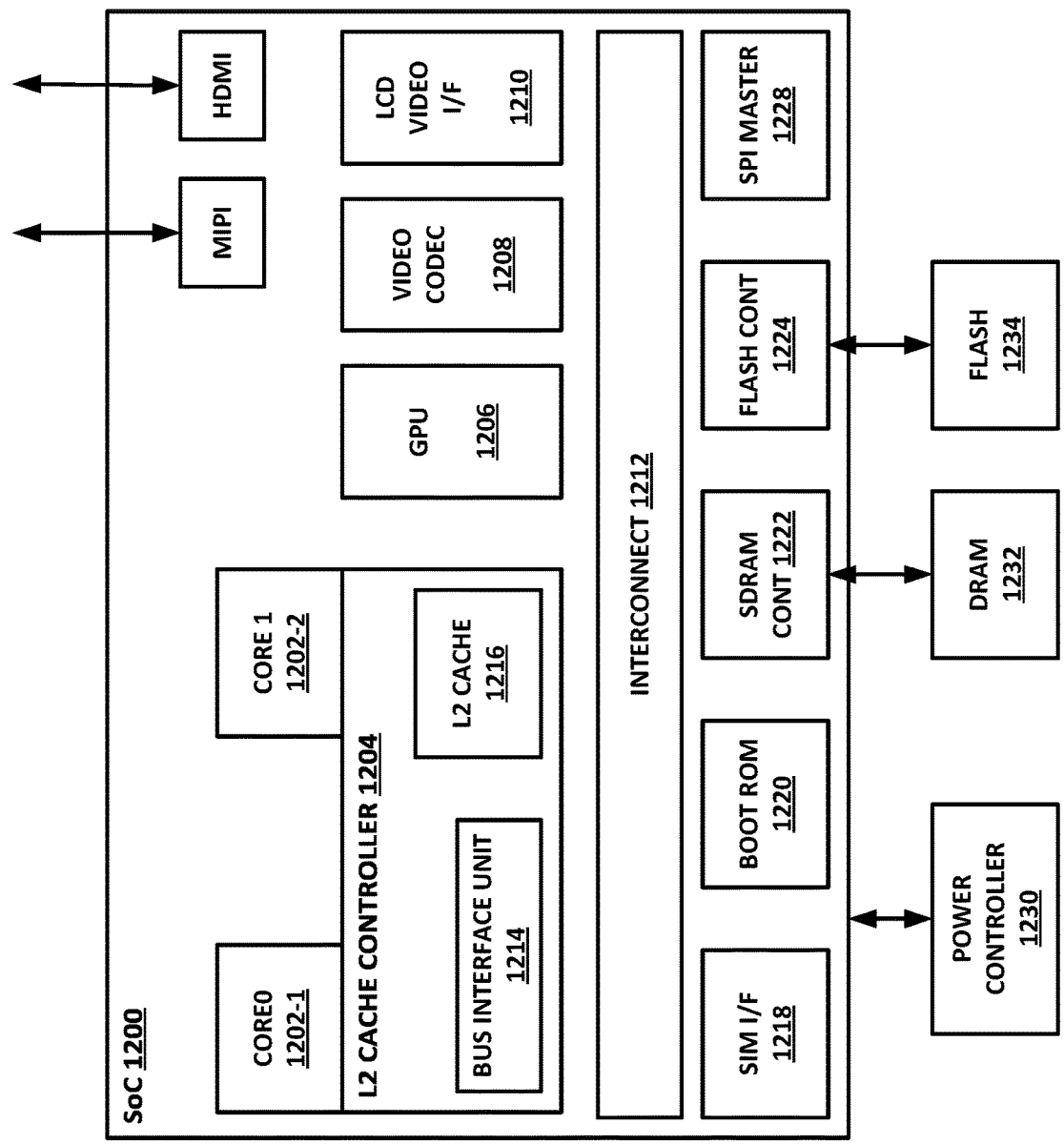
FIG. 12 is a block diagram of selected elements of a system-on-a-chip (SoC).

FIG. 12 is a block illustrating selected elements of an example SoC 1200. In at least some embodiments, SoC 1200 may be configured or adapted to provide split tunnel-based security, substantially as described in the present disclosure.

At least some of the teachings of the present specification may be embodied on an SoC 1200, or may be paired with an SoC 1200. SoC 1200 may include, or may be paired with, an advanced reduced instruction set computer machine (ARM) component. For example, SoC 1200 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 1200 could also be integrated into, for example, a PC, server, video processing components, laptop computer, notebook computer, netbook, or touch-enabled device.

As with hardware platform 1100 above, SoC 1200 may include multiple cores 1202-1 and 1202-2. In this illustrative example, SoC 1200 also includes an L2 cache control 1204, a GPU 1206, a video codec 1208, a liquid crystal display (LCD) I/F 1210 and an interconnect 1212. L2 cache control 1204 can include a bus interface unit 1214, a L2 cache 1216. Liquid crystal display (LCD) I/F 1210 may be associated with mobile industry processor interface (MIPI)/HDMI links that couple to an LCD.

SoC 1200 may also include a subscriber identity module (SIM) I/F 1218, a boot ROM 1220, a synchronous dynamic random access memory (SDRAM) controller 1222, a flash controller 1224, a serial peripheral interface (SPI) master 1228, a suitable power control 1230, a dynamic RAM (DRAM) 1232, and flash 1234. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1200 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 13 is a block diagram illustrating selected elements of a processor 1300. In at least some embodiments, processor 1300 may be configured or adapted to provide split tunnel-based security, substantially as described in the present disclosure.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1300 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1300 includes one or more processor cores 1302, including core 1302-1-1302-N. Cores 1302 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1300 may include at least one shared cache 1330, which may be treated logically as part of memory 1340. Memory 1340 may include executable instructions 1342, as illustrated. Caches 1330 may be filled according to known caching techniques, and may store instructions and/or data that may be used by one or more components of processor 1300.

Processor 1300 may include an integrated memory controller (MC) 1334, to communicate with memory 1340. Memory controller 1334 may include logic and circuitry to interface with memory 1340, and may also include a cache controller to handle filling and evicting instructions and data to and from cache 1330.

By way of example, each core 1302 may include front-end logic 1306, execution logic 1314, and backend logic 1318.

In the illustrated embodiment, front-end logic 1306 includes an instruction decoder or decoders 1308, register renaming logic 1310, and scheduling logic 1312. Decoder 1308 may decode instructions received. Register renaming logic 1310 may provide register renaming, for example to facilitate pipelining. Scheduling logic 1312 may schedule instruction execution, and may provide out-of-order (OOO) execution. Front-end logic 1306 may fetch incoming instructions, perform various processing (e.g., caching, decoding, branch predicting, etc.), and pass instructions to execution logic 1314.

Execution logic 1314 includes one or more execution units 1316-1-1316-N. Execution units 1316 may include hardware instructions and microcode to carry out the provided instructions.

Backend logic 1318 includes retirement logic 1320. Core 1302 may provide for speculative execution of instructions, branch prediction, and similar. Retirement logic 1320 may be configured to determine which predicted instructions were actually needed by the program flow.

Processor 1300 may also include a PtP controller 1332, which enables connection to an uncore, chipset, Northbridge, Southbridge, or bus, by way of example.

Figure 14:
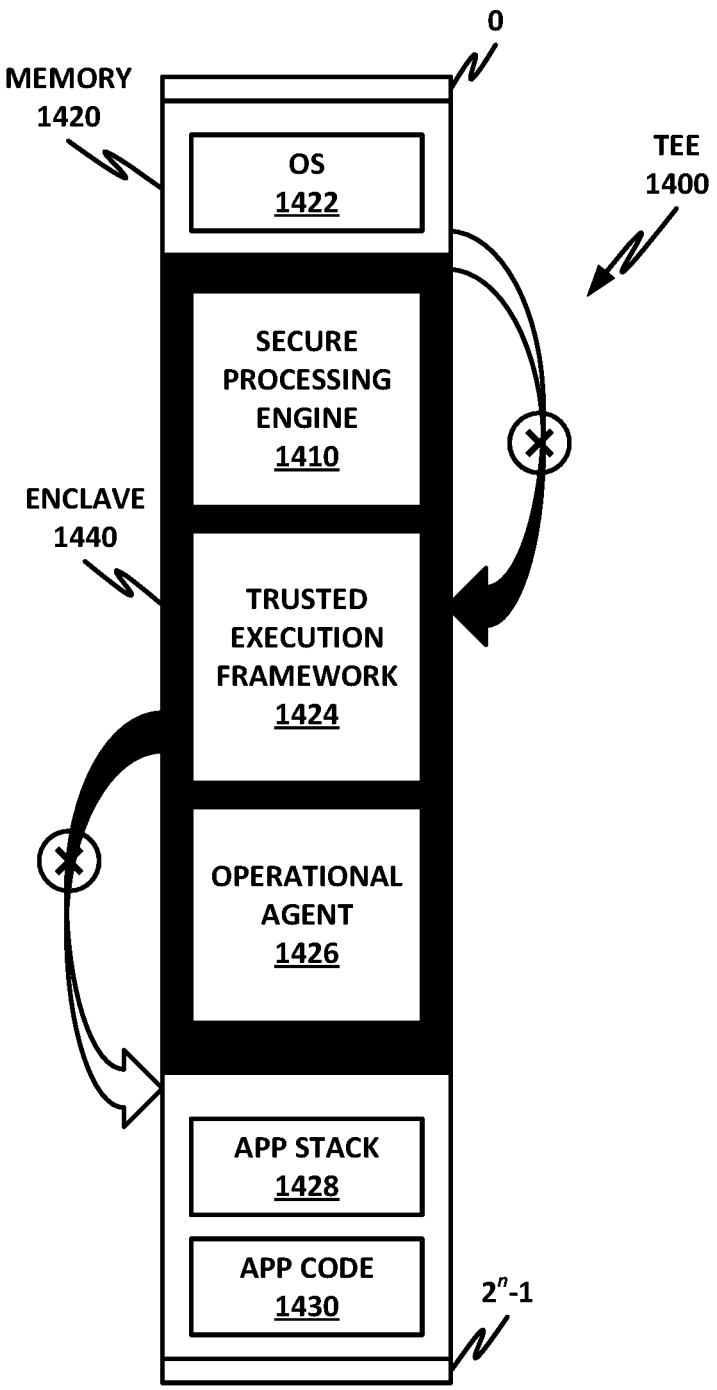
FIG. 14 is a block diagram of selected elements of a trusted execution environment (TEE).

FIG. 14 is a block diagram of a trusted execution environment (TEE) 1400. In at least some embodiments, one or more methods of split tunnel-based security may be implemented within TEE 1400, substantially as disclosed in the present specification.

In the example of FIG. 14, memory 1420 is addressable by n-bits, ranging in address from 0 to $2^n-1$ (note, however, that in many cases, the size of the address space may far exceed the actual memory available). Within memory 1420 is an OS 1422, enclave 1440, application stack 1420, and application code 1430.

In this example, enclave 1440 is a specially-designated portion of memory 1420 that cannot be entered into or exited from except via special instructions, such as Intel Software Guard Extensions (SGX) or similar. Enclave 1440 is provided as an example of a secure environment which, in conjunction with a secure processing engine 1410, trusted execution framework 1424, and operational agent 1426, forms a TEE 1400 on a hardware platform such as platform 1100 of FIG. 11. A TEE 1400 is a combination of hardware, software, and/or memory allocation that provides the ability to securely execute instructions without interference from outside processes, in a verifiable way. By way of example, TEE 1400 may include memory enclave 1440 or some other protected memory area, and a secure processing engine 1410, which includes hardware, software, and instructions for accessing and operating on enclave 1440. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1410 may be a user-mode application that operates via trusted execution framework 1424 within enclave 1440. TEE 1400 may also conceptually include processor instructions that secure processing engine 1410 and trusted execution framework 1424 require to operate within enclave 1440.

Secure processing engine 1410, trusted execution framework 1424, and operational agent 1426 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1422 may be excluded from TCB, in addition to the regular application stack 1428 and application code 1430.

In certain systems, computing devices equipped with Intel SGX or equivalent instructions may be capable of providing an enclave 1440. It should be noted, however, that many other examples of TEEs are available, and TEE 1400 is provided only as one example thereof. Other secure environments may include, by way of nonlimiting example, a virtual machine, sandbox, testbed, test machine, or other similar device or method for providing a TEE 1400.

In an example, enclave 1440 provides a protected memory area that cannot be accessed or manipulated by ordinary computer instructions. Enclave 1440 is described with particular reference to an Intel SGX enclave by way of example, but it is intended that enclave 1440 encompass any secure processing area with suitable properties, regardless of whether it is called an "enclave."

One feature of an enclave is that once an enclave region 1440 of memory 1420 is defined, as illustrated, a program pointer cannot enter or exit enclave 1440 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1440.

Thus, once enclave 1440 is defined in memory 1104, a program executing within enclave 1440 may be safely verified to not operate outside of its bounds. This security feature means that secure processing engine 1410 is verifiably local to enclave 1440. Thus, when an untrusted packet provides its content to be rendered with trusted execution framework 1424 of enclave 1440, the result of the rendering is verified as secure.

Enclave 1440 may also digitally sign its output, which provides a verifiable means of ensuring that content has not been tampered with or modified since being rendered by secure processing engine 1410. A digital signature provided by enclave 1440 is unique to enclave 1440 and is unique to the hardware of the device hosting enclave 1440.

Figure 15:
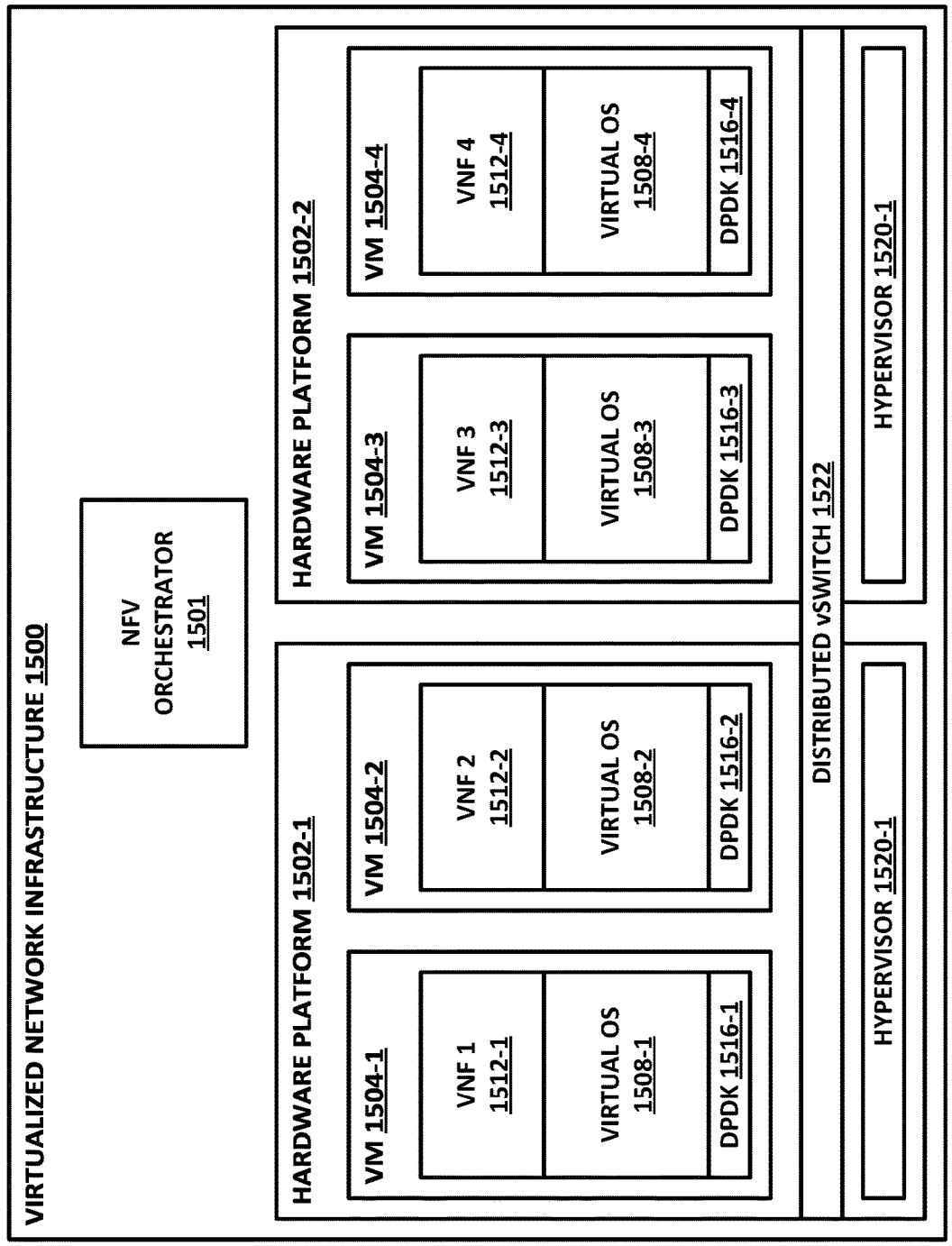
FIG. 15 is a block diagram of selected elements of a network function virtualization (NFV) infrastructure.

FIG. 15 is a block diagram of a network function virtualization (NFV) infrastructure 1500. In at least some embodiments, one or more methods of split tunnel-based security may be implemented within NFV infrastructure 1500, substantially as disclosed in the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or DPI appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1500. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 15, an NFV orchestrator 1501 manages a number of the VNFs 1512 running on an NFVI 1500. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1501 a valuable system resource. Note that NFV orchestrator 1501 may provide a browser-based or graphical configuration interface, and in some embodiments may be integrated with SDN orchestration functions.

Note that NFV orchestrator 1501 itself may be virtualized (rather than a special-purpose hardware appliance). NFV orchestrator 1501 may be integrated within an existing SDN system, wherein an operations support system (OSS) manages the SDN. This may interact with cloud resource management systems (e.g., OpenStack) to provide NFV orchestration. An NFVI 1500 may include the hardware, software, and other infrastructure to enable VNFs to run. This may include a hardware platform 1502 on which one or more VMs 1504 may run. For example, hardware platform 1502-1 in this example runs VMs 1504-1 and 1504-2. Hardware platform 1502-2 runs VMs 1504-3 and 1504-4. Each hardware platform may include a hypervisor 1520, VMM, or similar function, which may include and run on a native (bare metal) operating system, which may be minimal so as to consume very few resources.

Hardware platforms 1502 may be or comprise a rack or several racks of blade or slot servers (including, e.g., processors, memory, and storage), one or more data centers, other hardware resources distributed across one or more geographic locations, hardware switches, or network interfaces. An NFVI 1500 may also include the software architecture that enables hypervisors to run and be managed by NFV orchestrator 1501.

Running on NFVI 1500 are a number of VMs 1504, each of which in this example is a VNF providing a virtual service appliance. Each VM 1504 in this example includes an instance of the Data Plane Development Kit (DPDK), a virtual operating system 1508, and an application providing the VNF 1512.

Virtualized network functions could include, as nonlimiting and illustrative examples, firewalls, intrusion detection systems, load balancers, routers, session border controllers, DPI services, network address translation (NAT) modules, or call security association.

The illustration of FIG. 15 shows that a number of VNFs 1504 have been provisioned and exist within NFVI 1500. This FIGURE does not necessarily illustrate any relationship between the VNFs and the larger network, or the packet flows that NFVI 1500 may employ.

The illustrated DPDK instances 1516 provide a set of highly-optimized libraries for communicating across a virtual switch (vSwitch) 1522. Like VMs 1504, vSwitch 1522 is provisioned and allocated by a hypervisor 1520. The hypervisor uses a network interface to connect the hardware platform to the data center fabric (e.g., an HFI). This HFI may be shared by all VMs 1504 running on a hardware platform 1502. Thus, a vSwitch may be allocated to switch traffic between VMs 1504. The vSwitch may be a pure software vSwitch (e.g., a shared memory vSwitch), which may be optimized so that data are not moved between memory locations, but rather, the data may stay in one place, and pointers may be passed between VMs 1504 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1522 is illustrated, wherein vSwitch 1522 is shared between two or more physical hardware platforms 1502.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer readable storage media having stored thereon executable instructions that, when executed, cause a hardware platform or other computing system, to carry out a method or procedure. For example, the instructions could be executable object code, including software instructions executable by a processor. The one or more tangible, non-transitory computer readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a network interface; an operating system comprising a native internet protocol (IP) stack; and a security agent, comprising instructions encoded within the memory to instruct the processor to: establish a split virtual private network (VPN) tunnel with a remote VPN service; receive outgoing network traffic; direct a first portion of the outgoing traffic to the VPN tunnel, comprising determining that the first portion includes an outgoing domain name service (DNS) request; and direct a second portion of the outgoing traffic to the native IP stack.

There is further disclosed an example computing apparatus, wherein the operating system is a closed operating system.

There is further disclosed an example computing apparatus, wherein the apparatus is a mobile computing device.

There is further disclosed an example computing apparatus, wherein directing the second portion comprises determining that the second portion includes a fully-resolved destination IP address.

There is further disclosed an example computing apparatus, wherein determining that the first portion includes an outgoing DNS request comprises determining that a destination port is 53.

There is further disclosed an example computing apparatus, wherein the instructions are further to identify a class of traffic for tunneling, and direct all packets of the class to the VPN tunnel.

There is further disclosed an example computing apparatus, wherein the instructions are further to receive a DNS response via the VPN tunnel.

There is further disclosed an example computing apparatus, wherein the DNS response includes extended DNS data.

There is further disclosed an example computing apparatus, wherein the extended DNS data include an OPT pseudo-resource record.

There is further disclosed an example computing apparatus, wherein the instructions are to provide a parser to parse the extended DNS data and to act according to the extended DNS data.

There is further disclosed an example computing apparatus, wherein the parser is to parse a domain name reputation and act on the reputation.

There is further disclosed an example computing apparatus, wherein the domain name reputation is blocked, allowed, or suspicious.

There is further disclosed an example computing apparatus, wherein the parser is to parse a domain name category from the extended DNS data.

There is further disclosed an example computing apparatus, wherein the domain name category indicates that a domain belongs to a class of traffic that should be fully tunneled via the VPN.

There is further disclosed an example computing apparatus, wherein the domain name category indicates that a domain is a typo squatting domain.

There is further disclosed an example computing apparatus, wherein the domain name category indicates that a domain hosts illegal content.

There is further disclosed an example computing apparatus, wherein the domain name category indicates that a domain is for a website with questionable privacy terms.

There is further disclosed an example computing apparatus, wherein the domain name category indicates that a domain is blocked according to an end user or enterprise policy.

There is also disclosed an example of one or more tangible, non-transitory computer readable storage media having stored thereon executable instructions to: establish a virtual private network (VPN) with a VPN provider; intercept outgoing network traffic of a device; designate a first class of traffic for tunneling via the VPN; and designate a second class of traffic for handling via a native internet protocol (IP) stack, wherein the first class includes outgoing domain name service (DNS) lookup requests, and the second class excludes DNS lookup requests.

There is further disclosed an example of one or more tangible, non-transitory computer readable storage media, wherein the instructions are to operate within a closed operating system.

There is further disclosed an example of one or more tangible, non-transitory computer readable storage media, wherein designating the second class comprises determining that at least some of the traffic includes a fully-resolved destination IP address.

There is further disclosed an example of one or more tangible, non-transitory computer readable storage media, wherein the instructions are to determine that the first class includes outgoing DNS lookup requests by determining that a destination port is 53.

There is further disclosed an example of one or more tangible, non-transitory computer readable storage media, wherein the instructions are further to direct all packets of the first class to a VPN tunnel.

There is further disclosed an example of one or more tangible, non-transitory computer readable storage media, wherein the instructions are further to receive a DNS response via a VPN tunnel.

There is further disclosed an example of one or more tangible, non-transitory computer readable storage media, wherein the DNS response includes extended DNS data.

There is further disclosed an example of one or more tangible, non-transitory computer readable storage media, wherein the extended DNS data include an OPT pseudo-resource record.

There is further disclosed an example of one or more tangible, non-transitory computer readable storage media, wherein the instructions are to provide a parser to parse the extended DNS data and to act according to the extended DNS data.

There is further disclosed an example of one or more tangible, non-transitory computer readable storage media, wherein the parser is to parse a domain name reputation and act on the reputation.

There is further disclosed an example of one or more tangible, non-transitory computer readable storage media, wherein the domain name reputation is blocked, allowed, or suspicious.

There is further disclosed an example of one or more tangible, non-transitory computer readable storage media, wherein the parser is to parse a domain name category from the DNS response.

There is further disclosed an example of one or more tangible, non-transitory computer readable storage media, wherein the domain name category indicates that a domain belongs to a class of traffic that should be fully tunneled via the VPN.

There is further disclosed an example of one or more tangible, non-transitory computer readable storage media, wherein the domain name category indicates that a domain is a typo squatting domain.

There is further disclosed an example of one or more tangible, non-transitory computer readable storage media, wherein the domain name category indicates that a domain hosts illegal content.

There is further disclosed an example of one or more tangible, non-transitory computer readable storage media, wherein the domain name category indicates that a domain is for a website with questionable privacy terms.

There is further disclosed an example of one or more tangible, non-transitory computer readable storage media, wherein the domain name category indicates that a domain is blocked according to an end-user or enterprise policy.

There is also disclosed a method of providing split tunneling of domain name service (DNS) lookups on a mobile device with a closed operating system, comprising: segregating DNS traffic from non-DNS traffic; establishing a split tunnel with a virtual private network (VPN) service; tunneling at least some DNS traffic to a cloud service via the VPN service; receiving reputation data for a domain name from the at least some DNS traffic; acting on the reputation; and handling at least some non-DNS traffic via a non-VPN network stack.

There is further disclosed an example method, wherein handling at least some non-DNS traffic via the non-VPN network stack comprises determining that the non-DNS traffic includes a fully-resolved destination IP address.

There is further disclosed an example method, further comprising determining if the DNS traffic includes an outgoing DNS request by determining that a destination port is 53.

There is further disclosed an example method, further comprising identifying a class of traffic for tunneling, and directing all packets of the class to the VPN service.

There is further disclosed an example method, further comprising receiving a DNS response via the VPN service.

There is further disclosed an example method, wherein the DNS response includes extended DNS data.

There is further disclosed an example method, wherein the extended DNS data include an OPT pseudo-resource record.

There is further disclosed an example method, further comprising providing a parser to parse the extended DNS data and to act according to the extended DNS data.

There is further disclosed an example method, wherein the parser is to parse a domain name reputation and act on the reputation.

There is further disclosed an example method, wherein the domain name reputation is blocked, allowed, or suspicious.

There is further disclosed an example method, wherein the parser is to parse a domain name category from the extended DNS data.

There is further disclosed an example method, wherein the domain name category indicates that a domain belongs to a class of traffic that should be fully tunneled via the VPN service.

There is further disclosed an example method, wherein the domain name category indicates that a domain is a typo squatting domain.

There is further disclosed an example method, wherein the domain name category indicates that a domain hosts illegal content.

There is further disclosed an example method, wherein the domain name category indicates that a domain is for a website with questionable privacy terms.

There is further disclosed an example method, wherein the domain name category indicates that a domain is blocked according to an end-user or enterprise policy.

There is further disclosed an example apparatus comprising means for performing the method a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

What is claimed is:

1. A method of providing a security agent application to a computing apparatus, comprising:
    within a closed operating system, wherein the closed operating system sandboxes applications from one another, establishing a split tunnel over a native internet protocol (IP) stack, wherein a first tunnel of the split tunnel redirects to a cloud security service, and a second tunnel of the split tunnel is a passthrough to the native IP stack;
    receiving network traffic from a sandboxed application, directing at least some domain name system (DNS) traffic through the first tunnel, and directing non-DNS traffic through the second tunnel;
    wherein directing at least some DNS traffic through the first tunnel comprises sending a DNS query to resolve a domain name to a cloud-based security service and receiving in response an extensible DNS (EDNS) packet comprising reputation data for the domain name, and acting on the reputation data.

2. The method of claim 1, wherein the computing apparatus is a mobile computing device.

3. The method of claim 1, wherein directing at least some domain name system (DNS) traffic through the first tunnel further comprises determining that a DNS request is for a domain name that has a cached reputation, and directing the DNS request through the second tunnel.

4. The method of claim 1, wherein directing at least some DNS traffic through the first tunnel comprises determining that a packet has a destination port is 53.

5. The method of claim 1, further comprising identifying a class of traffic for tunneling, and directing all packets of the class of traffic to the first tunnel.

6. The method of claim 1, further comprising receiving a DNS response via the first tunnel.

7. The method of claim 1, wherein the EDNS packet includes an OPT pseudo-resource record.

8. The method of claim 7, further comprises parsing the EDNS packet before acting on the reputation data.

9. The method of claim 8, wherein parsing the EDNS packet comprises parsing a domain name reputation.

10. The method of claim 9, further comprising caching the domain name reputation.

11. One or more tangible, nontransitory computer-readable storage media having stored thereon executable instructions to instruct a processor circuit to:
within a closed operating system of a computing apparatus, wherein the closed operating system sandboxes applications from one another, establish a split tunnel over a native internet protocol (IP) stack, wherein a first tunnel of the split tunnel redirects to a cloud security service, and a second tunnel of the split tunnel is a passthrough to the native IP stack;
receiving network traffic from a sandboxed application, direct at least some domain name system (DNS) traffic through the first tunnel, and direct non-DNS traffic through the second tunnel;
wherein directing at least some DNS traffic through the first tunnel comprises sending a DNS query to resolve a domain name to a cloud-based security service and receiving in response an extensible DNS (EDNS) packet comprising reputation data for the domain name, and acting on the reputation data.

12. The one or more tangible, nontransitory computer-readable storage media of claim 11, wherein the computing apparatus is a mobile computing device.

13. The one or more tangible, nontransitory computer-readable storage media of claim 11, wherein directing at least some domain name system (DNS) traffic through the first tunnel further comprises determining that a DNS request is for a domain name that has a cached reputation, and directing the DNS request through the second tunnel.

14. The one or more tangible, nontransitory computer-readable storage media of claim 11, further comprising identifying a class of traffic for tunneling, and directing all packets of the class of traffic to the first tunnel.

15. The one or more tangible, nontransitory computer-readable storage media of claim 11, wherein the EDNS packet includes an OPT pseudo-resource record.

16. The one or more tangible, nontransitory computer-readable storage media of claim 11, further comprising caching a domain name reputation received via the EDNS packet.

17. A computing apparatus, comprising:
a processor circuit and a memory; and
instruction encoded within the memory to instruct the processor circuit to:
within a closed operating system, wherein the closed operating system sandboxes applications from one another, establish a split tunnel over a native internet protocol (IP) stack, wherein a first tunnel of the split tunnel redirects to a cloud security service, and a second tunnel of the split tunnel is a passthrough to the native IP stack;
receiving network traffic from a sandboxed application, direct at least some domain name system (DNS) traffic through the first tunnel, and direct non-DNS traffic through the second tunnel;
wherein directing at least some DNS traffic through the first tunnel comprises sending a DNS query to resolve a domain name to a cloud-based security service and receiving in response an extensible DNS (EDNS) packet comprising reputation data for the domain name, and acting on the reputation data.

18. The one or more tangible, nontransitory computer-readable storage media of claim 17, wherein directing at least some domain name system (DNS) traffic through the first tunnel further comprises determining that a DNS request is for a domain name that has a cached reputation, and directing the DNS request through the second tunnel.

19. The one or more tangible, nontransitory computer-readable storage media of claim 18, further comprising identifying a class of traffic for tunneling, and directing all packets of the class of traffic to the first tunnel.

20. The one or more tangible, nontransitory computer-readable storage media of claim 17, wherein the EDNS packet includes an OPT pseudo-resource record.

\* \* \* \* \*

UNITED STATES PATENT AND TRADEMARK OFFICE
CERTIFICATE OF CORRECTION

PATENT NO. : 11,711,345 B2
APPLICATION NO. : 16/913048
DATED : July 25, 2023
INVENTOR(S) : Joshi et al.

Page 1 of 1

It is certified that error appears in the above-identified patent and that said Letters Patent is hereby corrected as shown below:

On the Title Page

Item (72), under "Inventors", in Column 1, Line 5, delete "Karnataka" and insert -- Bangalore --, therefor.

In the Claims

In Column 42, Claim 18, Lines 29-30, delete "one or more tangible, nontransitory computer-readable storage media" and insert -- computing apparatus --, therefor.

In Column 42, Claim 19, Lines 35-36, delete "one or more tangible, nontransitory computer-readable storage media" and insert -- computing apparatus --, therefor.

In Column 42, Claim 20, Lines 39-40, delete "one or more tangible, nontransitory computer-readable storage media" and insert -- computing apparatus --, therefor.

Signed and Sealed this
Third Day of October, 2023

Katherine Kelly Vidal
*Director of the United States Patent and Trademark Office*